United States Patent
Ikeda

(10) Patent No.: US 12,147,115 B2
(45) Date of Patent: *Nov. 19, 2024

(54) DISPLAY MEDIUM, DISPLAY PRODUCT, AND DISPLAY SET

(71) Applicant: ZEON CORPORATION, Tokyo (JP)

(72) Inventor: Akira Ikeda, Tokyo (JP)

(73) Assignee: ZEON CORPORATION, Tokyo (JP)

(*) Notice: Subject to any disclaimer, the term of this patent is extended or adjusted under 35 U.S.C. 154(b) by 450 days.

This patent is subject to a terminal disclaimer.

(21) Appl. No.: 17/597,099

(22) PCT Filed: Jul. 2, 2020

(86) PCT No.: PCT/JP2020/026100
§ 371 (c)(1),
(2) Date: Dec. 27, 2021

(87) PCT Pub. No.: WO2021/020024
PCT Pub. Date: Feb. 4, 2021

(65) Prior Publication Data
US 2022/0244595 A1  Aug. 4, 2022

(30) Foreign Application Priority Data

Jul. 31, 2019 (JP) .................................. 2019-141797

(51) Int. Cl.
*G02F 1/1335* (2006.01)
*G02B 5/08* (2006.01)
(Continued)

(52) U.S. Cl.
CPC ..... *G02F 1/133541* (2021.01); *G02B 5/0808* (2013.01); *G02B 5/3016* (2013.01);
(Continued)

(58) Field of Classification Search
CPC ......... G02F 1/133541; G02F 1/133536; G02F 1/133543; G02B 5/3016; G02B 5/3025;
(Continued)

(56) References Cited

U.S. PATENT DOCUMENTS 6,061,122 A    5/2000  Hoshino et al.
6,217,792 B1   4/2001  Parri et al.
(Continued)

FOREIGN PATENT DOCUMENTS

EP    1748306 A1    1/2007
EP    3351980 A1    7/2018
(Continued)

OTHER PUBLICATIONS

Feb. 1, 2022, International Preliminary Report on Patentability issued in the International Patent Application No. PCT/JP2020/026100.

(Continued)

*Primary Examiner* — Paisley L Wilson
(74) *Attorney, Agent, or Firm* — KENJA IP LAW PC

(57) ABSTRACT

A display medium comprising: a multilayered substrate including a polarized light separation layer and a phase difference layer; and a first reflective layer provided on a surface of the multilayered substrate on a side with the polarized light separation layer, wherein: the polarized light separation layer can reflect circularly polarized light which has one rotation direction $D_A$, and can transmit circularly polarized light which has an opposite rotation direction to the rotation direction $D_A$; the first reflective layer can reflect circularly polarized light which has one rotation direction $D_{B1}$, and can transmit circularly polarized light which has an opposite rotation direction to the rotation direction $D_{B1}$; and the rotation direction $D_A$ of the circularly polarized light that the polarized light separation layer can reflect and the (Continued)

rotation direction $D_{B1}$ of the circularly polarized light that the first reflective layer can reflect are the same as each other.

15 Claims, 13 Drawing Sheets

(51) Int. Cl.
    *G02B 5/30* (2006.01)
    *G02B 27/28* (2006.01)
    *B42D 25/351* (2014.01)
    *B42D 25/36* (2014.01)
(52) U.S. Cl.
    CPC ......... *G02B 5/3025* (2013.01); *G02B 5/3083* (2013.01); *G02B 27/283* (2013.01); *G02F 1/133536* (2013.01); *G02F 1/133543* (2021.01); *B42D 25/351* (2014.10); *B42D 25/36* (2014.10)
(58) Field of Classification Search
    CPC .. G02B 5/3083; G02B 27/283; G02B 5/0808; G02B 5/0816; B42D 25/351; B42D 25/36; B42D 25/364
    See application file for complete search history.

(56) References Cited

U.S. PATENT DOCUMENTS

| | | | |
|---|---|---|---|
| 6,468,444 | B1 | 10/2002 | Meyer et al. |
| 2003/0137632 | A1 | 7/2003 | Kawabata |
| 2004/0247825 | A1 | 12/2004 | Faris et al. |
| 2007/0159671 | A1 | 7/2007 | Hoshino et al. |
| 2008/0129036 | A1 | 6/2008 | Seki et al. |
| 2008/0282322 | A1 | 11/2008 | Saito |
| 2010/0134724 | A1 | 6/2010 | Arakawa et al. |
| 2014/0022493 | A1 | 1/2014 | Hoshino et al. |
| 2015/0285979 | A1 | 10/2015 | Aimatsu |
| 2016/0245972 | A1 | 8/2016 | Yamanaka et al. |
| 2018/0143363 | A1 | 5/2018 | Ichihashi et al. |
| 2019/0187351 | A1 | 6/2019 | Yamanaka et al. |
| 2019/0243043 | A1* | 8/2019 | Inada ................. G09F 19/12 |
| 2020/0264358 | A1 | 8/2020 | Kawabata |

FOREIGN PATENT DOCUMENTS

| | | |
|---|---|---|
| JP | H0672962 A | 3/1994 |
| JP | 2000255200 A | 9/2000 |
| JP | 2000290315 A | 10/2000 |
| JP | 2001004829 A | 1/2001 |
| JP | 2003066214 A | 3/2003 |
| JP | 2003313187 A | 11/2003 |
| JP | 2003342219 A | 12/2003 |
| JP | 2004115414 A | 4/2004 |
| JP | 2004341417 A | 12/2004 |
| JP | 3652476 B2 | 5/2005 |
| JP | 2005289881 A | 10/2005 |
| JP | 2007057971 A | 3/2007 |
| JP | 2007093675 A | 4/2007 |
| JP | 2007094625 A | 4/2007 |
| JP | 2007176870 A | 7/2007 |
| JP | 2007216602 A | 8/2007 |
| JP | 2008197223 A | 8/2008 |
| JP | 2008203801 A | 9/2008 |
| JP | 2009166319 A | 7/2009 |
| JP | 2009288312 A | 12/2009 |
| JP | 2009300662 A | 12/2009 |
| JP | 2010111104 A | 5/2010 |
| JP | 2010196005 A | 9/2010 |
| JP | 2014076583 A | 5/2014 |
| JP | 2014141057 A | 8/2014 |
| JP | 2014174471 A | 9/2014 |
| JP | 2014174472 A | 9/2014 |
| JP | 2015027743 A | 2/2015 |
| JP | 5828182 B2 | 12/2015 |
| JP | 6142714 B2 | 6/2017 |
| JP | 2017185668 A | 10/2017 |
| JP | 2017215580 A | 12/2017 |
| JP | 2017219760 A | 12/2017 |
| WO | 9800428 A1 | 1/1998 |
| WO | 2004032099 A1 | 4/2004 |
| WO | 2007007784 A1 | 1/2007 |
| WO | 2007018258 A1 | 2/2007 |
| WO | 2014069515 A1 | 5/2014 |
| WO | 2015064581 A1 | 5/2015 |
| WO | 2016043219 A1 | 3/2016 |
| WO | 2016056617 A1 | 4/2016 |
| WO | 2018034215 A1 | 2/2018 |
| WO | 2018079130 A1 | 5/2018 |
| WO | 2019059067 A1 | 3/2019 |

OTHER PUBLICATIONS

Aug. 7, 2023, the Extended European Search Report issued by the European Patent Office in the corresponding European Patent Application No. 20847513.7.
Sep. 8, 2020, International Search Report issued in the International Patent Application No. PCT/JP2020/026100.
Aug. 11, 2020, International Search Report issued in the International Patent Application No. PCT/JP2020/022170.
Dec. 28, 2021, International Preliminary Report on Patentability issued in the International Patent Application No. PCT/JP2020/022170.
Feb. 26, 2024, Office Action issued by the United States Patent and Trademark Office in the U.S. Appl. No. 17/596,908.
Jun. 26, 2023, the Extended European Search Report issued by the European Patent Office in the European Patent Application No. 20832349.3.
Nov. 17, 2023, Office Action issued by the United States Patent and Trademark Office in the U.S. Appl. No. 17/596,908.

* cited by examiner

DISPLAY MEDIUM, DISPLAY PRODUCT, AND DISPLAY SET

TECHNICAL FIELD

The present invention relates to a display medium, a display article to be observed through the display medium, and a display set including these in combination.

BACKGROUND ART

A circular polarizing plate generally has a function of selectively transmitting either circularly polarized light (that is, clockwise circularly polarized light) which has a clockwise rotation direction or circularly polarized light (that is, counterclockwise circularly polarized light) which has a counterclockwise rotation direction. By utilizing such a function, the circular polarizing plate has conventionally been used for application of authenticity identification (Patent Literature 1 and 2).

CITATION LIST

Patent Literature

Patent Literature 1: Japanese Patent No. 5828182
Patent Literature 2: Japanese Patent No. 3652476

SUMMARY OF THE INVENTION

Technical Problem

The present inventor has considered that the aforementioned function of the circular polarizing plate can be utilized for application other than in authenticity identification and has attempted to create a novel display mode.

The present invention has been made in view of the above-mentioned problems, and an object thereof is to provide a display set that can achieve a novel display mode that has not yet been achieved, and to provide a display medium and a display article that can be applied to the display set.

Solution to Problem

The present inventor intensively conducted research for solving the above-mentioned problems. As a result, the present inventor has found that the above-mentioned problems can be solved by a display set including, in combination: a display medium which includes a multilayered substrate including a polarized light separation layer which has a circularly polarized light separation function and a phase difference layer, and a reflective layer provided on a surface of the multilayered substrate and which has a specific circularly polarized light separation function; and a display article which includes a foundation article and a display layer which has a circularly polarized light separation function. Thus, the present invention has been accomplished.

That is, the present invention includes the following.

<1> A display medium comprising: a multilayered substrate including a polarized light separation layer and a phase difference layer; and a first reflective layer provided on a surface of the multilayered substrate on a side with the polarized light separation layer, wherein:
the polarized light separation layer can reflect circularly polarized light which has one rotation direction $D_A$, and can transmit circularly polarized light which has an opposite rotation direction to the rotation direction $D_A$;
the first reflective layer can reflect circularly polarized light which has one rotation direction $D_{B1}$, and can transmit circularly polarized light which has an opposite rotation direction to the rotation direction $D_{B1}$; and
the rotation direction $D_A$ of the circularly polarized light that the polarized light separation layer can reflect and the rotation direction $D_{B1}$ of the circularly polarized light that the first reflective layer can reflect are the same as each other.

<2> The display medium according to <1>, comprising a second reflective layer provided on a surface of the multilayered substrate on a side with the phase difference layer, wherein:
the second reflective layer can reflect circularly polarized light which has one rotation direction $D_{B2}$, and can transmit circularly polarized light which has an opposite rotation direction to the rotation direction $D_{B2}$; and
the rotation direction $D_A$ of the circularly polarized light that the polarized light separation layer can reflect is opposite to the rotation direction $D_{B2}$ of the circularly polarized light that the second reflective layer can reflect.

<3> A display medium comprising: a multilayered substrate including a polarized light separation layer and a phase difference layer; and a second reflective layer provided on a surface of the multilayered substrate on a side with the phase difference layer, wherein:
the polarized light separation layer can reflect circularly polarized light which has one rotation direction $D_A$, and can transmit circularly polarized light which has an opposite rotation direction to the rotation direction $D_A$;
the second reflective layer can reflect circularly polarized light which has one rotation direction $D_{B2}$, and can transmit circularly polarized light which has an opposite rotation direction to the rotation direction $D_{B2}$; and
the rotation direction $D_A$ of the circularly polarized light that the polarized light separation layer can reflect is opposite to the rotation direction $D_{B2}$ of the circularly polarized light that the second reflective layer can reflect.

<4> The display medium according to <1> or <2>, wherein the first reflective layer includes a flake of a resin which has cholesteric regularity.

<5> The display medium according to <2> or <3>, wherein the second reflective layer includes a flake of a resin which has cholesteric regularity.

<6> The display medium according to any one of <1> to <5>, wherein an in-plane retardation of the phase difference layer at a measurement wavelength of 590 nm is "$\{(2n+1)/2\} \times 590$ nm$-30$ nm" or more and "$\{(2n+1)/2\} \times 590$ nm$+30$ nm" or less (provided that n represents an integer of 0 or larger).

<7> The display medium according to any one of <1> to <6>, wherein a wavelength width of a wavelength range in which the polarized light separation layer can reflect circularly polarized light is 70 nm or wider.

<8> The display medium according to any one of <1> to <7>, wherein the polarized light separation layer is a layer of a resin which has cholesteric regularity.

<9> A display article to be observed through the display medium according to any one of <1> to <8>,
the display article comprising: a foundation article and a display layer provided on the foundation article, wherein the display layer can reflect circularly polarized light which has one rotation direction $D_D$, and can transmit circularly polarized light which has an opposite rotation direction to the rotation direction $D_D$.

<10> The display article according to <9>, comprising, as the display layer, at least one of a first display layer that can reflect circularly polarized light which has a rotation direction $D_{D1}$ which is the same as the rotation direction $D_A$ of the circularly polarized light that the polarized light separation layer can reflect, and can transmit circularly polarized light which has an opposite rotation direction to the rotation direction $D_{D1}$, and a second display layer that can reflect circularly polarized light which has a rotation direction $D_{D2}$ which is opposite to the rotation direction $D_A$ of the circularly polarized light that the polarized light separation layer can reflect, and can transmit circularly polarized light which has an opposite rotation direction to the rotation direction $D_{D2}$.

<11> A display set comprising:
the display medium according to any one of <1> to <8>; and
the display article according to <9> or <10>.

Advantageous Effects of Invention

According to the present invention, it is possible to provide a display set that can achieve a novel display mode that has not yet been achieved, and a display medium and a display article that can be applied to the display set.

DESCRIPTION OF EMBODIMENTS

Figure 1:
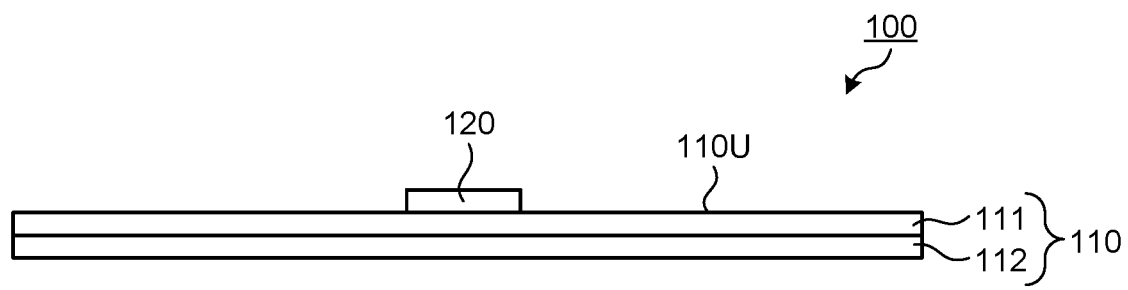
FIG. 1 is a cross-sectional view schematically illustrating a display medium according to a first embodiment of the present invention.

Hereinafter, the present invention will be described in detail with reference to embodiments and examples. However, the present invention is not limited to the embodiments and examples described hereinafter, and may be freely modified for implementation without departing from the scope of claims of the present invention and the scope of their equivalents.

In the following description, an in-plane retardation Re of a layer is a value represented by Re=(nx−ny)×d unless otherwise specified. Herein, nx represents a refractive index in a direction in which the maximum refractive index is given among directions (in-plane directions) perpendicular to the thickness direction of the layer, ny represents a refractive index in a direction, among the above-mentioned in-plane directions, perpendicular to the direction giving nx, nz represents a refractive index in a thickness direction, and d represents the thickness of the layer. The measurement wavelength is 590 nm unless otherwise specified.

In the following description, the term "circularly polarized light" includes elliptically polarized light within a range in which the advantageous effects of the present invention are not significantly impaired.

1. Summary of Display Set

A display set according to an embodiment of the present invention includes a display medium and a display article.

The display medium includes: a multilayered substrate including a polarized light separation layer and a phase difference layer; and a reflective layer such as a first reflective layer and a second reflective layer, provided on at least one surface of the multilayered substrate. The display article includes a foundation article and a display layer provided on the foundation article.

The multilayered substrate included in the display medium can transmit a part of irradiation light such as unpolarized light including both clockwise circularly polarized light and counterclockwise circularly polarized light. Specifically, the polarized light separation layer included in the multilayered substrate can reflect circularly polarized light which has one rotation direction $D_A$, which is either clockwise or counterclockwise, and can transmit circularly polarized light which has an opposite rotation direction to the rotation direction $D_A$. Accordingly, the multilayered substrate can be a member that is transparent or semi-transparent with respect to irradiation light.

Also, the reflective layer included in the display medium is provided to be able to reflect circularly polarized light which has one rotation direction $D_B$, which is either clockwise or counterclockwise, and to transmit circularly polarized light which has an opposite rotation direction to the rotation direction $D_B$.

Specifically, a rotation direction $D_{B1}$ of circularly polarized light which can be reflected by a first reflective layer provided on a surface of the multilayered substrate on a side with the polarized light separation layer, as an example of the reflective layer, is set to be in the same direction as the rotation direction $D_A$ of circularly polarized light that the polarized light separation layer can reflect. Unless otherwise specified, the "surface of the multilayered substrate on a side with the polarized light separation layer" indicates a front surface or a back surface of the multilayered substrate, whichever has a shorter distance to the polarized light separation layer compared with the distance to the phase difference layer. Therefore, even in a case where light is transmitted through the multilayered substrate and is incident onto the first reflective layer, a rotation direction $D_C$ of at least a part of circularly polarized light included in the light is opposite to the rotation direction $D_{B1}$ of the circularly polarized light that the first reflective layer can reflect.

Also, a rotation direction $D_{B2}$ of circularly polarized light that a second reflective layer provided on a surface of the multilayered substrate on a side with the phase difference layer can reflect is set to be in an opposite direction to the rotation direction $D_A$ of the circularly polarized light that the polarized light separation layer can reflect. Unless otherwise specified, the "surface of the multilayered substrate on a side with the phase difference layer" indicates a front surface or a back surface of the multilayered substrate, whichever has a longer distance to the polarized light separation layer compared with the distance to the phase difference layer. Therefore, even in a case where light is transmitted through the multilayered substrate and is incident onto the second reflective layer, the rotation direction $D_C$ of at least a part of the circularly polarized light included in the light is opposite to the rotation direction $D_{B2}$ of the circularly polarized light that the second reflective layer can reflect.

Therefore, regarding each of reflective layers, which are the first reflective layer and the second reflective layer, when light is transmitted through the multilayered substrate and is incident onto the reflective layer, a part or the entirety of the light is not reflected by the reflective layer.

Hence, the reflective layer can be visually recognized when the display medium is observed from a side with the reflective layer since strong light reflection occurs on the reflective layer. However, the reflective layer cannot be visually recognized when the display medium is observed from an opposite side to the reflective layer, since light reflection does not occur or occurs only slightly on the reflective layer. Accordingly, in a case where the display medium is observed under light including both clockwise circularly polarized light and counterclockwise circularly polarized light, an image of the display medium which can be visually recognized when observed from the front surface and an image of the display medium which can be visually recognized when observed from the back surface can be different from each other although the multilayered substrate is transparent or semi-transparent.

Also, since the multilayered substrate is transparent or semi-transparent as described above under irradiation light including both clockwise circularly polarized light and counterclockwise circularly polarized light, at least a part of the display medium may be transparent or semi-transparent. Therefore, an observer can observe the display article through the display medium. Herein, since the phase difference layer included in the multilayered substrate changes a polarization state of light transmitted through the phase difference layer, the rotation direction of circularly polarized light blocked by the multilayered substrate may differ depending on the traveling direction of the circularly polarized light. For example, in a case where clockwise circularly polarized light to be irradiated onto the front surface of the multilayered substrate is blocked by the multilayered substrate, the multilayered substrate can blocked counterclockwise circularly polarized light irradiated onto the back surface of the multilayered substrate. Accordingly, in the display medium, circularly polarized light to be blocked can be switched between clockwise circularly polarized light and counterclockwise circularly polarized light depending on the direction of the display medium, the front facing direction or the back facing direction.

The display layer of the display article is provided to be able to reflect circularly polarized light having a particular rotation direction and to transmit circularly polarized light having an opposite rotation direction to the particular rotation direction. Hence, circularly polarized light reflected by the display layer can be blocked or unblocked by the display medium depending on the direction of the display medium. Accordingly, in a case where the display article is observed through the display medium, an image of the display article which can be visually recognized when observed from the front surface and an image of the display article which can be visually recognized when observed from the back surface can be different from each other.

In this manner, with the display set according to the present embodiment, an image of the display medium and an image of the display article which are visually recognized can differ depending on the direction of the display medium. Hence, by utilizing a combination of such different images, a complementary design can be accomplished, a novel display mode that has not yet been achieved can be achieved, and a complex and highly-flexible design can be produced.

2. First Embodiment of Display Medium

Figure 2:
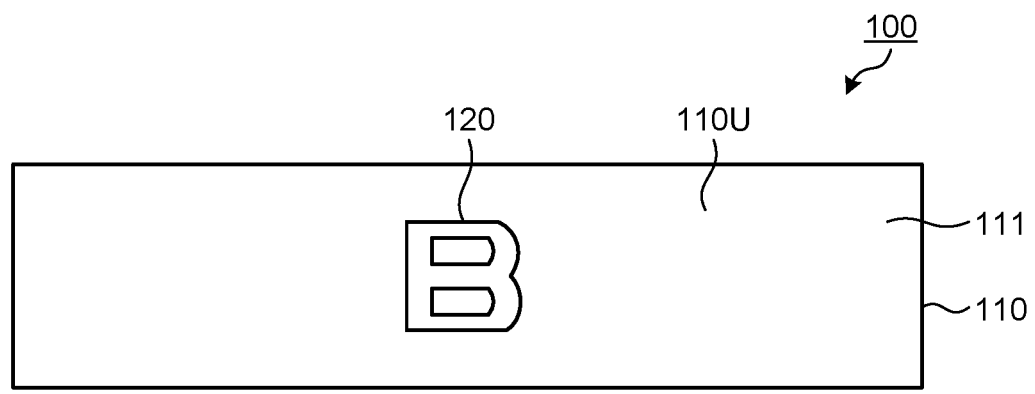
FIG. 2 is a schematic plan view of the display medium according to the first embodiment of the present invention as viewed from one side (a side with a first reflective layer).
Figure 3:
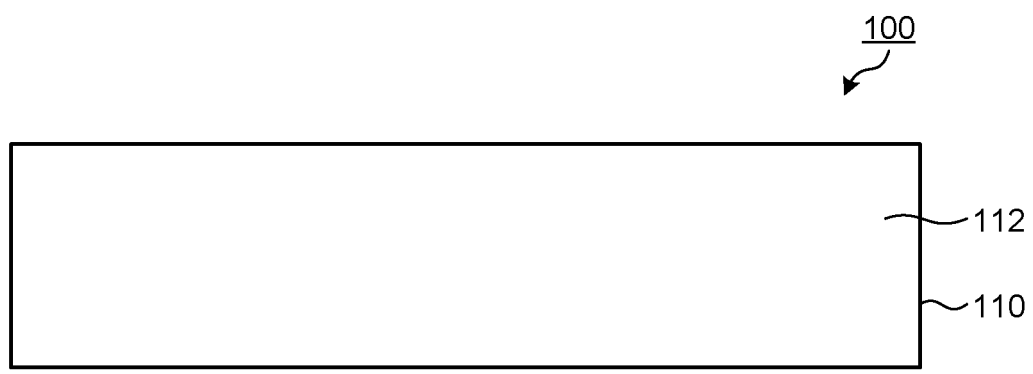
FIG. 3 is a schematic plan view of the display medium according to the first embodiment of the present invention as viewed from the other side (an opposite side to the side with the first reflective layer).

FIG. 1 is a cross-sectional view schematically illustrating a display medium 100 according to a first embodiment of the present invention. FIG. 2 is a schematic plan view of the display medium 100 according to the first embodiment of the present invention as viewed from one side (a side with a first reflective layer 120). FIG. 3 is a schematic plan view of the display medium 100 according to the first embodiment of the present invention as viewed from the other side (an opposite side to the side with the first reflective layer 120).

As illustrated in FIGS. 1 to 3, the display medium 100 according to the first embodiment of the present invention includes a multilayered substrate 110 and the first reflective layer 120, which serves as a reflective layer, provided on a surface 110U of the multilayered substrate 110 on a side with a polarized light separation layer.

The multilayered substrate 110 includes a polarized light separation layer 111 and a phase difference layer 112.

The polarized light separation layer 111 has a circularly polarized light separation function. The "circularly polarized light separation function" refers to a function of reflecting circularly polarized light having either a clockwise rotation direction or a counterclockwise rotation direction and transmitting circularly polarized light having an opposite rotation direction thereto. Therefore, the polarized light separation layer 111 can reflect circularly polarized light having one rotation direction $D_A$ and can transmit circularly polarized light having an opposite rotation direction to the rotation direction $D_A$, in a wavelength range in which the polarized light separation layer 111 can exert the circularly polarized light separation function. In the following description, such a wavelength range in which the polarized light separation layer 111 can exert the circularly polarized light separation function may be referred to as a "polarized light separation wavelength range" as necessary. The reflectance of the polarized light separation layer 111 for unpolarized light in the polarized light separation wavelength range is usually 35% to 50%, and preferably 40% to 50%.

From the viewpoint of achieving a display mode that can be visually recognized with the naked eye, the polarized light separation wavelength range is preferably in a visible wavelength range. The visible wavelength range generally refers to a wavelength range from 400 nm to 780 nm.

The wavelength width of the polarized light separation wavelength range is preferably wide. A specific wavelength width of the polarized light separation wavelength range is preferably 70 nm or wider, more preferably 100 nm or wider, still more preferably 200 nm or wider, and particularly preferably 400 nm or wider. In a case where the wavelength width of the polarized light separation wavelength range is wide, the color range of circularly polarized light that the polarized light separation layer 111 can reflect can be broad. In this case, the flexibility, in terms of color, of the reflective layer such as the first reflective layer 120 and a display layer (not illustrated in FIGS. 1 to 3) of a display article can be enhanced, and a display mode with advanced design can be achieved. The upper limit of the wavelength width of the polarized light separation wavelength range is not particularly limited, and may be 600 nm or narrower, for example.

As the polarized light separation layer 111, a layer of a resin which has cholesteric regularity is preferable. Hereinbelow, a resin having cholesteric regularity may be referred to as a "cholesteric resin" as necessary. The cholesteric regularity is a structure in which the angle of molecular axes in stacking planes are shifted (twisted) as the planes are observed sequentially passing through the stacked planes, such that molecular axes in a certain first plane are oriented in a certain direction, molecular axes in a subsequent plane stacking on the first plane are oriented in a direction shifted by a small angle with respected to that of the first plane, and molecular axes in still another plane are oriented in a direction of a further shifted angle. That is, when molecules inside a layer have cholesteric regularity, molecular axes of the molecules on a first plane inside the layer are aligned along a constant direction. On the subsequent second plane stacking on the first plane inside the layer, a direction of molecular axes is shifted by a slight angle from the direction of the molecular axes on the first plane. On the subsequent third plane further stacking on the second plane, a direction of molecular axes is further shifted by an angle from the direction of the molecular axes on the second plane. In this manner, on the planes disposed in a stacking manner, the angles of the molecular axes on these planes are sequentially shifted (twisted). The structure in which the directions of the molecular axes are twisted in this manner is usually a helical structure and is an optically chiral structure.

The layer of the cholesteric resin can usually exert the circularly polarized light separation function. Reflection of a circularly polarized light by the layer of the cholesteric resin take place with the chirality of the circularly polarized light being maintained.

The specific wavelength at which the layer of the cholesteric resin exerts the circularly polarized light separation function generally depends on a pitch of the helical structure in the layer of the cholesteric resin. The pitch of the helical structure is a distance in a plane normal direction, from the start of gradual shifting of the direction of molecular axes with an angle in the helical structure as proceeding through planes, to the return to the original direction of molecular axes. The size of this pitch of the helical structure can be adjusted to control a wavelength at which a circularly polarized light separation function is exerted. As a method for adjusting the pitch, a method described in Japanese Patent Application Laid-Open No. 2009-300662 A may be adopted, for example. Specific examples thereof may include a method of adjusting the type of a chiral agent and a method of adjusting the amount of the chiral agent, in a cholesteric liquid crystal composition. In particular, when the size of the pitch of the helical structure continuously varies within the layer, a single layer of the cholesteric resin can provide a circularly polarized light separation function over a wide range of wavelength.

Examples of the layer of the cholesteric resin that can exert the circularly polarized light separation function in a broad wavelength range may include (i) a layer of a cholesteric resin in which the size of the pitch of the helical structure is changed in a stepwise manner and (ii) a layer of a cholesteric resin in which the size of the pitch of the helical structure is changed continuously.

(i) The layer of the cholesteric resin in which the size of the pitch of the helical structure is changed in a stepwise manner can be obtained by stacking a plurality of layers of the cholesteric resin having different pitches of the helical structure, for example. After a plurality of layers of the cholesteric resin having different pitches of the helical structure have been produced in advance, stacking can be performed by bonding together the layers via a tackiness agent or an adhesive agent. Alternatively, the stacking can be performed by forming a layer of the cholesteric resin and then sequentially forming other layers of the cholesteric resin thereon.

(ii) The layer of the cholesteric resin in which the size of the pitch of the helical structure is changed continuously can be obtained by subjecting a liquid crystal composition layer to a bandwidth broadening treatment including one or more times of irradiation treatment with active energy ray and/or warming treatment and then curing the liquid crystal composition layer, for example. The aforementioned bandwidth broadening treatment can continuously change the pitch of the helical structure in the thickness direction, and the wavelength range (reflection bandwidth) in which the layer of the cholesteric resin can exert the circularly polarized light separation function can thus be broadened. For this reason, the treatment is called a bandwidth broadening treatment.

The layer of the cholesteric resin may be a layer having a single-layered structure that includes only one layer or a layer having a multilayered structure that includes two or more layers. From the viewpoint of facilitation of producing it, the number of layers included in the layer of the cholesteric resin is preferably 1 to 100 layers, and more preferably 1 to 20 layers.

The method for producing the layer of the cholesteric resin is not limited, and the layer of the cholesteric resin may generally be produced with the use of a cholesteric liquid crystal composition. The cholesteric liquid crystal composition refers to a composition in which a liquid crystal compound can exhibit a liquid crystal phase with cholesteric regularity (cholesteric liquid crystal phase) in a case where the liquid crystal compound contained in the liquid crystal composition is oriented. Herein, a material called "liquid crystal composition" for convenience includes not only a mixture of two or more substances but also a material consisting of a single substance. Specific examples of the method for producing a layer of the cholesteric resin may include methods described in Japanese Patent Application Laid-Open No. 2014-174471 A and Japanese Patent Application Laid-Open No. 2015-27743 A. In such production methods using a cholesteric liquid crystal composition, a twisting direction in cholesteric regularity can appropriately be selected depending on the structure of a chiral agent contained in the liquid crystal composition. For example, in a case where the twisting direction is to be a clockwise direction, a cholesteric liquid crystal composition containing a chiral agent for imparting dextrorotation may be used, and in a case where the twisting direction is to be a counterclockwise direction, a cholesteric liquid crystal composition containing a chiral agent for imparting levorotation may be used.

The thickness of the polarized light separation layer 111 is preferably 2 μm or more, and more preferably 3 or more, and is preferably 1000 μm or less, and more preferably 500 μm or less. In a case where the thickness of the polarized light separation layer 111 is equal to or more than the lower limit value of the aforementioned range, the reflective layer such as the first reflective layer 120 can be difficult to be visually recognized when the display medium 100 is observed from an opposite side to a side with the reflective layer. On the other hand, in a case where the thickness of the polarized light separation layer 111 is equal to or less than the upper limit value of the aforementioned range, transparency can be enhanced.

The phase difference layer 112 is a layer provided on one side of the polarized light separation layer 111 and which has an in-plane retardation Re in a particular range. A part or the entirety of the phase difference layer 112 overlaps with a part or the entirety of the polarized light separation layer 111 when viewed in the thickness direction. That is, a part or the entirety of the phase difference layer 112 and a part or the entirety of the polarized light separation layer 111 are in the same position in the in-plane direction perpendicular to the thickness direction of the display medium 100. In the present embodiment, a description will be given while illustrating an example in which the entirety of the phase difference layer 112 and the entirety of the polarized light separation layer 111 overlap with each other when viewed in the thickness direction.

The range of the in-plane retardation Re of the phase difference layer 112 may be set within a range in which an image visually recognized when one side of the display medium 100 is observed and an image visually recognized when the other side of the display medium 100 is observed differ enough to cause a desired design to be obtained. Usually, the in-plane retardation Re of the phase difference layer 112 is set such that the rotation direction of circularly polarized light that has transmitted through the polarized light separation layer can be inverted.

A specific range of the in-plane retardation Re of the phase difference layer 112 at a measurement wavelength of 590 nm is preferably "$\{(2n+1)/2\} \times 590$ nm$-30$ nm" or more, more preferably "$\{(2n+1)/2\} \times 590$ nm$-20$ nm" or more, and particularly preferably "$\{(2n+1)/2\} \times 590$ nm$-10$ nm" or more, and is preferably "$\{(2n+1)/2\} \times 590$ nm$+30$ nm" or less, more preferably "$\{(2n+1)/2\} \times 590$ nm$+20$ nm" or less, and particularly preferably "$\{(2n+1)/2\} \times 590$ nm$+10$ nm" or less. Herein, n represents an integer of 0 or larger. Since the phase difference layer 112 having the in-plane retardation Re in the aforementioned range at the measurement wavelength of 590 nm can usually function as a half-wave plate in a broad range of a visible wavelength region, the phase difference layer 112 can appropriately adjust a polarization state of circularly polarized light of various colors. Therefore, since the flexibility, in terms of color, of the reflective layer such as the first reflective layer 120 and the display layer (not illustrated in FIGS. 1 to 3) of the display article can be enhanced, a display mode with advanced design can be achieved.

The phase difference layer 112 preferably has a reverse wavelength dispersion property. The reverse wavelength dispersion property is a property in which in-plane retardations Re(450) and Re(550) at measurement wavelengths of 450 nm and 550 nm, respectively, satisfy Formula (R1) described below.

$$Re(450) < Re(550) \tag{R1}$$

The phase difference layer 112 having the reverse wavelength dispersion property can exert an optical function thereof in a broad wavelength range. Therefore, by using the phase difference layer 112 having the reverse wavelength dispersion property, the phase difference layer 112 can function as a half-wave plate in a broad range of a visible wavelength region. Thus, the phase difference layer 112 can appropriately adjust a polarization state of circularly polarized light of various colors. Therefore, since the flexibility, in terms of color, of the reflective layer such as the first reflective layer 120 and the display layer (not illustrated in FIGS. 1 to 3) of the display article can be enhanced, a display mode with advanced design can be achieved.

As the phase difference layer 112, a stretched film can be used, for example. The stretched film is a film obtained by stretching a resin film and can have a desired in-plane retardation by appropriately adjusting factors such as a type of the resin, stretching conditions, and a thickness. As the resin, thermoplastic resins may be generally used. The thermoplastic resin may contain a polymer, and an optional component as needed. Examples of the polymer may include polycarbonate, polyether sulfone, polyethylene terephthalate, polyimide, polymethyl methacrylate, polysulfone, polyarylate, polyethylene, polyphenylene ether, polystyrene, polyvinyl chloride, cellulose diacetate, cellulose triacetate, and an alicyclic structure-containing polymer. As the polymer, one type thereof may be solely used, and two or more types thereof may also be used in combination at any ratio. Among these, the alicyclic structure-containing polymer is preferable from the viewpoint of transparency, low hygroscopicity, size stability, and workability. The alicyclic structure-containing polymer is a polymer containing an alicyclic structure in a main chain and/or a side chain, and those described in Japanese Patent Application Laid-Open No. 2007-057971 A may be used, for example.

The stretched film which serves as the phase difference layer 112 can be produced by producing a resin film from the aforementioned resin and then subjecting the resin film to a stretching treatment. As a specific example of the method for producing the phase difference layer 112 as the stretched film, methods described in International Publication No. 2019/059067 may be mentioned.

The thickness of the stretched film is not particularly limited, and is preferably 5 μm or more, more preferably 10 μm or more, and particularly preferably 20 or more, and is preferably 1 mm or less, more preferably 500 μm or less, and particularly preferably 200 μm or less.

As the phase difference layer 112, a liquid crystal cured layer may be used, for example. The liquid crystal cured layer is a layer formed of a cured product of a liquid crystal composition containing a liquid crystal compound. Generally, the liquid crystal cured layer is obtained by forming a layer of a liquid crystal composition, orienting the molecules of the liquid crystal compound contained in the layer of the liquid crystal composition, and then curing the layer of the liquid crystal composition. The liquid crystal cured layer can have a desired in-plane retardation by appropriately adjusting factors such as a type of the liquid crystal compound, an orientation state of the liquid crystal compound, and a thickness.

The type of the liquid crystal compound is optionally selected. In a case where the phase difference layer 112 having a reverse wavelength dispersion property is to be obtained, a liquid crystal compound with a reverse wavelength dispersion property is preferably used. The liquid crystal compound with a reverse wavelength dispersion property refers to a liquid crystal compound that exhibits a reverse wavelength dispersion property in a case where the liquid crystal compound is homogeneously oriented. The homogeneous orientation of a liquid crystal compound means that a layer containing the liquid crystal compound is formed, and a direction giving the maximum refractive index in the refractive index ellipsoid of the molecule of the liquid crystal compound in the layer is oriented in one direction parallel to the surface of the layer. Specific examples of the liquid crystal compound with a reverse wavelength dispersion property may include compounds described in International Publication No. 2014/069515 and International Publication No. 2015/064581.

The thickness of the liquid crystal cured layer is not particularly limited, and is preferably 0.5 μm or more, and more preferably 1.0 μm or more, and is preferably 10 μm or less, more preferably 7 μm or less, and particularly preferably 5 μm or less.

The multilayered substrate 110 may include an optional layer (not illustrated) within a range in which the advantageous effects of the present invention are not significantly impaired. Examples of the optional layer may include a supporting layer that supports the polarized light separation layer 111 and the phase difference layer 112 and an adhesive layer that bonds the polarized light separation layer 111 and the phase difference layer 112 together. Each of these optional layers preferably has a low in-plane retardation. A specific in-plane retardation of each of the optional layers is preferably 20 nm or less, more preferably 10 nm or less, particularly preferably 5 nm or less, and ideally 0 nm. Since such a layer having a low in-plane retardation is an optically isotropic layer, changes in polarization state due to each of the optional layers can be suppressed.

The first reflective layer 120, which serves as a reflective layer, is provided on the surface 110U of the multilayered substrate 110 on a side with the polarized light separation layer. The first reflective layer 120 may be provided directly or indirectly on the surface 110U of the multilayered substrate 110. A layer being provided "directly" on a surface means that no other layer is provided between the surface and the layer. A layer being provided "indirectly" on a surface means that another layer (such as an adhesive layer) is provided between the surface and the layer.

The first reflective layer 120 may be provided on a part or the entirety of the surface 110U of the multilayered substrate 110. Usually, when viewed in the thickness direction, the first reflective layer 120 is provided to overlap with both the polarized light separation layer 111 and the phase difference layer 112 of the multilayered substrate 110. That is, the entirety of the first reflective layer 120, a part or the entirety of the phase difference layer 112, and a part or the entirety of the polarized light separation layer 111 are usually at the same position in the in-plane direction perpendicular to the thickness direction of the display medium 100. In addition, the first reflective layer 120 may have a planar shape corresponding to a design of the display medium 100. In the present embodiment, the first reflective layer 120 having a planar shape of a character "B" will be described by illustrating an example. In this example, the entirety of the first reflective layer 120 overlaps with a part of the polarized light separation layer 111 and a part of the phase difference layer 112 of the multilayered substrate 110 when viewed in the thickness direction.

The first reflective layer 120 has a circularly polarized light separation function. Therefore, the first reflective layer 120 can reflect circularly polarized light having one rotation direction $D_{B1}$ and can transmit circularly polarized light having an opposite rotation direction to the rotation direction $D_{B1}$, in a wavelength range in which the first reflective layer 120 can exert the circularly polarized light separation function. In the following description, such a wavelength range in which the first reflective layer 120 can exert the circularly polarized light separation function may be referred to as a "first reflection wavelength range" as necessary. The range of the reflectance of the first reflective layer 120 for unpolarized light in the first reflection wavelength range may be the same as the range of the reflectance of the polarized light separation layer 111 for unpolarized light in the polarized light separation wavelength range.

The first reflection wavelength range of the first reflective layer 120 usually overlaps with the polarized light separation wavelength range of the polarized light separation layer 111 included in the multilayered substrate 110. A part of the first reflection wavelength range and a part of the polarized light separation wavelength range may overlap with each other, the entirety of the first reflection wavelength range and a part of the polarized light separation wavelength range may overlap with each other, a part of the first reflection wavelength range and the entirety of the polarized light separation wavelength range may overlap with each other, and the entirety of the first reflection wavelength range and the entirety of the polarized light separation wavelength range may overlap with each other. Among these, the entirety of the first reflection wavelength range preferably overlaps with a part or the entirety of the polarized light separation wavelength range so that the first reflection wavelength range is within the polarized light separation wavelength range. Hence, preferably, the lower limit of the first reflection wavelength range is equal to or higher than the lower limit of the polarized light separation wavelength range, and the upper limit of the first reflection wavelength range is equal to or lower than the upper limit of the polarized light separation wavelength range. In this case, when the display medium 100 is observed from an opposite side to the first reflective layer 120, the visual recognizability for the first reflective layer 120 can effectively be lowered.

The rotation direction $D_{B1}$ of circularly polarized light that the first reflective layer 120 can reflect is set to be the same direction as the rotation direction $D_A$ of circularly polarized light that the polarized light separation layer 111 can reflect. Therefore, in a case where light is transmitted through the multilayered substrate 110 and is incident onto the first reflective layer 120, the rotation direction $D_C$ of at least a part of circularly polarized light (specifically, circularly polarized light in the polarized light separation wavelength range) included in the light is opposite to the rotation direction $D_{B1}$ of circularly polarized light that the first reflective layer 120 can reflect. Accordingly, the first reflective layer 120 does not or substantially does not reflect light which has been transmitted through the multilayered substrate 110 and which is incident onto the first reflective layer 120.

Such a first reflective layer 120 may be a layer of the cholesteric resin, and is preferably a layer including cholesteric resin flakes. The cholesteric resin flakes can be used as a pigment including minute layers of a cholesteric resin. Therefore, the layer including cholesteric resin flakes can exert a circularly polarized light separation function as that of the layer of the cholesteric resin itself. Generally, due to a shear force applied at the time of forming the layer including cholesteric resin flakes, the principal surfaces of the flakes and the layer planar surface of the layer including the flakes are oriented in parallel or substantially in parallel. However, since the orientation directions of the flakes may be uneven, circularly polarized light reflected by the flakes may be scattered in the entire layer including the cholesteric resin flakes. When the scattering occurs, the layer including the cholesteric resin flakes may be visually recognized as a different image from the surroundings. Accordingly, even in a case where the polarized light separation wavelength range of the polarized light separation layer 111 and the first reflection wavelength range of the first reflective layer 120 correspond to each other so that the color of the polarized light separation layer 111 and the color of the first reflective layer 120 are the same, the first reflective layer 120 can be visually recognized due to the aforementioned scattering.

The particle diameter of the cholesteric resin flake is preferably 1 µm or more for the decorative purpose. Particularly, the particle diameter of the flake is desirably equal to or more than the thickness of the layer including the flakes. In this case, it is easy to orient each of the flakes so that the principal surface of the flake and the layer planar surface of the layer including the flakes are parallel or form an acute angle therebetween. Hence, the flakes can effectively receive light, and a circularly polarized light separation function of the layer including the flakes can thus be enhanced. The upper limit of the particle diameter of the flake is preferably 500 µm or less, and more preferably 100 µm or less, from the viewpoint of obtaining moldability and printability. Herein, the particle diameter of the flake refers to a diameter of a circle with the same area as that of the flake.

As the cholesteric resin flake, for example, a crushed product of a layer of the cholesteric resin described above may be used. Such flakes can be produced, for example, by the production method described in Japanese Patent No. 6142714.

The layer including the cholesteric resin flakes may include an optional component in combination with the flake. Examples of the optional component may include a binder for binding flakes. Examples of the binder may include polymers such as a polyester-based polymer, an acrylic polymer, a polystyrene-based polymer, a polyamide-based polymer, a polyurethane-based polymer, a polyolefin-based polymer, a polycarbonate-based polymer, and a polyvinyl-based polymer. The amount of the binder is preferably 20 parts by weight or more, more preferably 40 parts by weight or more, and particularly preferably 60 parts by weight or more, and is preferably 1,000 parts by weight or less, more preferably 800 parts by weight or less, and particularly preferably 600 parts by weight or less, relative to 100 parts by weight of the flake.

The layer including the cholesteric resin flakes may be produced, for example, by applying an ink containing the flake, a solvent, and, if necessary, an optional component, and drying the ink. As a solvent, an inorganic solvent such as water may be used. Alternatively, an organic solvent such as a ketone solvent, an alkyl halide solvent, an amide solvent, a sulfoxide solvent, a heterocyclic compound, a hydrocarbon solvent, an ester solvent, and an ether solvent may be used. The amount of the solvent is preferably 40 parts by weight or more, more preferably 60 parts by weight or more, and particularly preferably 80 parts by weight or more, and is preferably 1,000 parts by weight or less, more preferably 800 parts by weight or less, and particularly preferably 600 parts by weight or less, relative to 100 parts by weight of the flake.

The ink may contain a monomer of a polymer as a binder in place of, or in combination with, the polymer. In this case, the layer including the cholesteric resin flakes may be formed by applying an ink and drying the ink, and then polymerizing the monomer. When the monomer is contained, the ink preferably contains a polymerization initiator.

Figure 4:
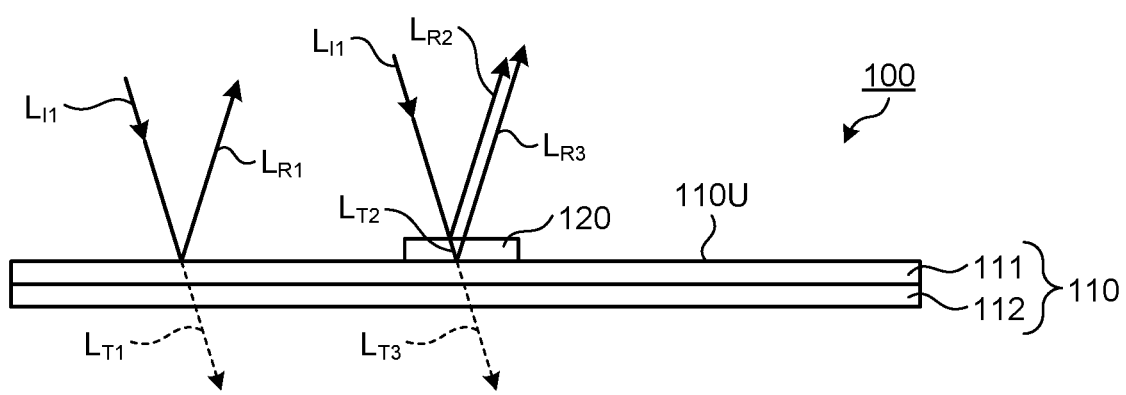
FIG. 4 is a cross-sectional view schematically illustrating the display medium according to the first embodiment of the present invention.
Figure 5:
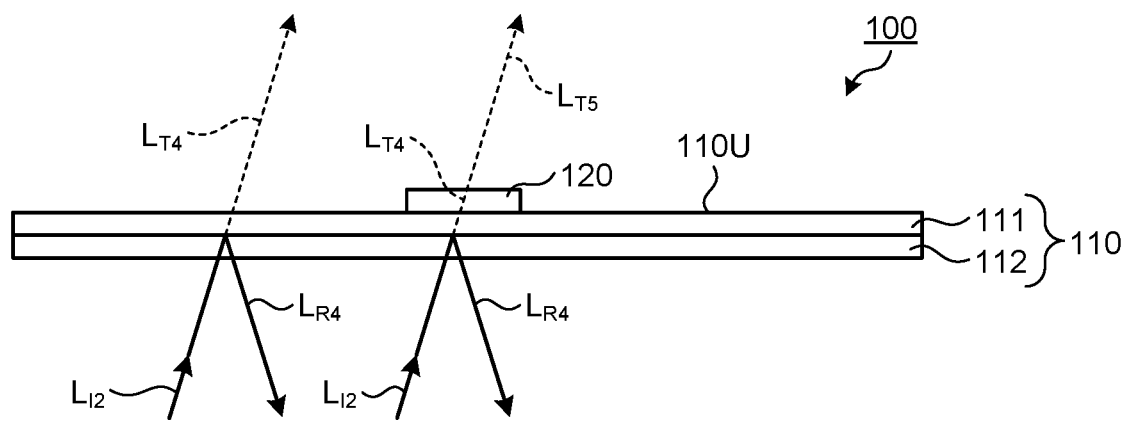
FIG. 5 is a cross-sectional view schematically illustrating the display medium according to the first embodiment of the present invention.

FIGS. 4 and 5 are each a cross-sectional view schematically illustrating the display medium 100 according to the first embodiment of the present invention. In FIGS. 4 and 5, paths of light reflected by the polarized light separation layer 111 and the first reflective layer 120 are schematically illustrated. Although various types of other light absorption and reflection may occur than those described below in the actual display medium 100, main light paths will schematically be described below for convenience of description of operations.

FIG. 4 illustrates a case where irradiation light $L_{I1}$, such as unpolarized light, including both clockwise circularly polarized light and counterclockwise circularly polarized light, is irradiated onto a surface of the display medium 100 on a side with the first reflective layer 120. As illustrated in FIG. 4, in an area where the first reflective layer 120 is not provided, the irradiation light $L_{I1}$ is incident onto the polarized light separation layer 111 since the polarized light separation layer 111 and the phase difference layer 112 are disposed in this order. A part of the irradiation light $L_{I1}$ is reflected by the polarized light separation layer 111 as circularly polarized light $L_{R1}$ having the rotation direction $D_A$. Light $L_{T1}$ other than the reflected circularly polarized light $L_{R1}$ is transmitted through the polarized light separation layer 111, is transmitted through the phase difference layer 112 as well, and goes out of the display medium 100. Since the circularly polarized light $L_{R1}$ is reflected by the polarized light separation layer 111, a part or the entirety of the light $L_{T1}$ that has been transmitted through the polarized light separation layer 111 is circularly polarized light which has an opposite rotation direction to the rotation direction $D_A$ at the time immediately after being transmitted through the polarized light separation layer 111. However, since the part or the entirety of the light $L_{T1}$ is transmitted through the phase difference layer 112 to cause the rotation direction thereof to be inverted, a part or the entirety of circularly polarized light included in the light $L_{T1}$ after being transmitted through the phase difference layer 112 is circularly polarized light which has the same rotation direction as the rotation direction $D_A$.

As illustrated in FIG. 4, since the first reflective layer 120, the polarized light separation layer 111, and the phase difference layer 112 are arranged in this order in an area where the first reflective layer 120 is provided, the irradiation light $L_{I1}$ is incident onto the first reflective layer 120. A part of circularly polarized light included in the irradiation light $L_{I1}$ is reflected by the first reflective layer 120 as circularly polarized light $L_{R2}$ which has the rotation direction $D_{B1}$. Light $L_{T2}$ other than the reflected circularly polarized light $L_{R2}$ is incident onto the polarized light separation layer 111. The incident light $L_{T2}$ may include circularly polarized light $L_{R3}$ having the rotation direction $D_A$ that the polarized light separation layer 111 can reflect. Therefore, a part of the light $L_{T2}$ may be reflected by the polarized light separation layer 111 as the circularly polarized light $L_{R3}$ which has the rotation direction $D_A$. Light $L_{T3}$ other than the reflected circularly polarized light $L_{R2}$ and $L_{R3}$ is transmitted through the polarized light separation layer 111, is transmitted through the phase difference layer 112 as well, and goes out of the display medium 100. As in the area where the first reflective layer 120 is not provided, a part or the entirety of circularly polarized light included in the light $L_{T3}$ transmitted through the phase difference layer 112 and which goes out of the display medium 100 is circularly polarized light which has the same rotation direction as the rotation direction $D_A$.

In this manner, in a case where the surface of the display medium 100 on the side with the first reflective layer 120 is irradiated with the irradiation light $L_{I1}$ including both clockwise circularly polarized light and counterclockwise circularly polarized light and is observed, an observer can visually recognize the circularly polarized light $L_{R2}$ reflected by the first reflective layer 120 since strong light reflection occurs on the first reflective layer 120. Accordingly, the observer observing the display medium 100 from the side with the first reflective layer 120 can visually recognize the image of the first reflective layer 120 as illustrated in FIG. 2.

On the other hand, FIG. 5 illustrates a case where irradiation light $L_{I2}$, such as unpolarized light, including both clockwise circularly polarized light and counterclockwise circularly polarized light, is irradiated onto a surface of the display medium 100 on an opposite side to the side with the first reflective layer 120. As illustrated in FIG. 5, in the area where the first reflective layer 120 is not provided, the irradiation light $L_{I2}$ is transmitted through the phase difference layer 112 of the multilayered substrate 110 and then is incident onto the polarized light separation layer 111. A part of the irradiation light $L_{I2}$ is reflected by the polarized light separation layer 111 as circularly polarized light $L_{R4}$ which has the rotation direction $D_A$ and is transmitted through the phase difference layer 112 to cause the rotation direction thereof to be inverted. Light $L_{T4}$ other than the reflected circularly polarized light $L_{R4}$ is transmitted through the polarized light separation layer 111 and goes out of the display medium 100. Since the circularly polarized light $L_{R4}$ is reflected by the polarized light separation layer 111, a part or the entirety of the light $L_{T4}$ transmitted through the polarized light separation layer 111 and which goes out of the display medium 100 is circularly polarized light which has an opposite rotation direction to the rotation direction $D_A$.

Also, as illustrated in FIG. 5, in the area where the first reflective layer 120 is provided, a part of the irradiation light $L_{I2}$ is reflected by the polarized light separation layer 111 as circularly polarized light $L_{R4}$ which has the rotation direction $D_A$, and light $L_{T4}$ other than the reflected circularly polarized light $L_{R4}$ is transmitted through the polarized light separation layer 111, as well as in the area where the first reflective layer 120 is not provided. The light $L_{T4}$ that has been transmitted through the polarized light separation layer 111 is then incident onto the first reflective layer 120. However, since the circularly polarized light $L_{R4}$ is reflected by the polarized light separation layer 111, the rotation direction of a part or the entirety of circularly polarized light included in the light $L_{T4}$ that has been transmitted through the polarized light separation layer 111 is in an opposite direction to the rotation direction $D_A$ of the circularly polarized light $L_{R4}$ reflected by the polarized light separation layer 111. Herein, the rotation direction $D_{B1}$ of circularly polarized light that the first reflective layer 120, which serves as the reflective layer according to the present embodiment, can reflect is the same as the rotation direction $D_A$ of the circularly polarized light $L_{R4}$ reflected by the polarized light separation layer 111. Therefore, the light $L_{T4}$ which is incident onto the first reflective layer 120 includes none or just a small quantity of circularly polarized light which has the rotation direction $D_{B1}$ that the first reflective layer 120 can reflect. Thus, all or most of the light $L_{T4}$ is not reflected by the first reflective layer 120. Consequently, light $L_{T5}$, which is all or most of the light $L_{T4}$, is transmitted through the first reflective layer 120 and goes out of the display medium 100. Since the rotation direction $D_{B1}$ of circularly polarized light that the first reflective layer 120 can reflect and the rotation direction $D_A$ of circularly polarized light that the polarized light separation layer 111 can reflect are the same, a part or the entirety of the light $L_{T5}$ is circularly polarized light which has an opposite rotation direction to the rotation direction $D_A$ as in the area where the first reflective layer 120 is not provided.

In this manner, in a case where the surface of the display medium 100 on an opposite side to the first reflective layer 120 is irradiated with the irradiation light $L_{I2}$ including both clockwise circularly polarized light and counterclockwise circularly polarized light, and is observed, light reflection does not occur or occurs only slightly on the first reflective layer 120. Thus the observer cannot visually recognize light reflected by the first reflective layer 120. Accordingly, the observer observing from the side of the display medium 100, which is an opposite side to the first reflective layer 120, cannot visually recognize the image of the first reflective layer 120 as illustrated in FIG. 3.

Accordingly, in the display medium 100 according to the present embodiment, the first reflective layer 120 can be visually recognized when the display medium 100 is observed from the side with the first reflective layer. However, although the multilayered substrate 110 is transparent or semi-transparent, the first reflective layer 120 cannot be visually recognized when the display medium 100 is observed from the opposite side to the first reflective layer 120. Therefore, the display medium 100 can provide a special display mode in which an image of the display medium which can be visually recognized when the front surface is observed and an image of the display medium which can be visually recognized when the back surface is observed can be different from each other although the multilayered substrate 110 is transparent or semi-transparent.

Furthermore, in a case where the display medium 100 is used as a display set (not illustrated in the present embodiment) as described below, a visually recognized image of the display medium 100 as well as a visually recognized image of a display article (not illustrated in the present embodiment) can differ depending on the direction of the display medium, the front facing direction or the back facing direction.

3. Second Embodiment of Display Medium

In the first embodiment, an example was shown in which the first reflective layer 120 which serves as the reflective layer is provided on the surface 110U of the multilayered substrate 110 on the side with the polarized light separation layer, but the reflective layer may be formed on the surface of the multilayered substrate 110 on the side with the phase difference layer. Hereinafter, an embodiment in which the second reflective layer which serves as the reflective layer is provided on the surface of the multilayered substrate 110 on the side with the phase difference layer will be described.

Figure 6:
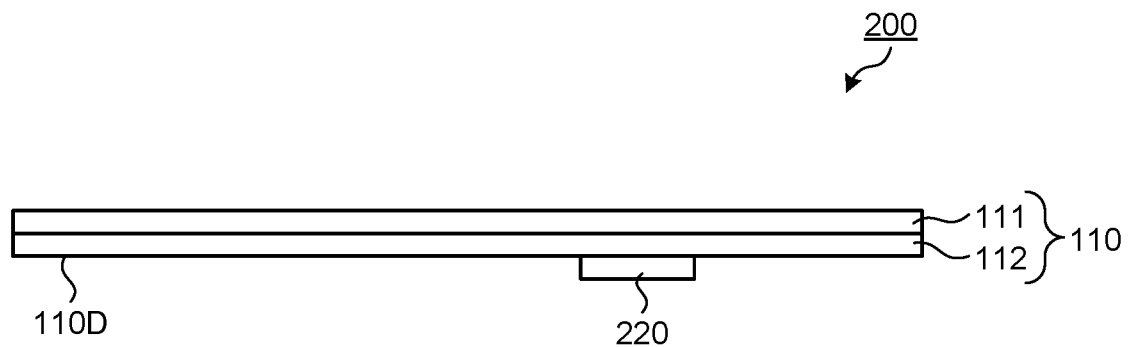
FIG. 6 is a cross-sectional view schematically illustrating a display medium according to a second embodiment of the present invention.
Figure 7:
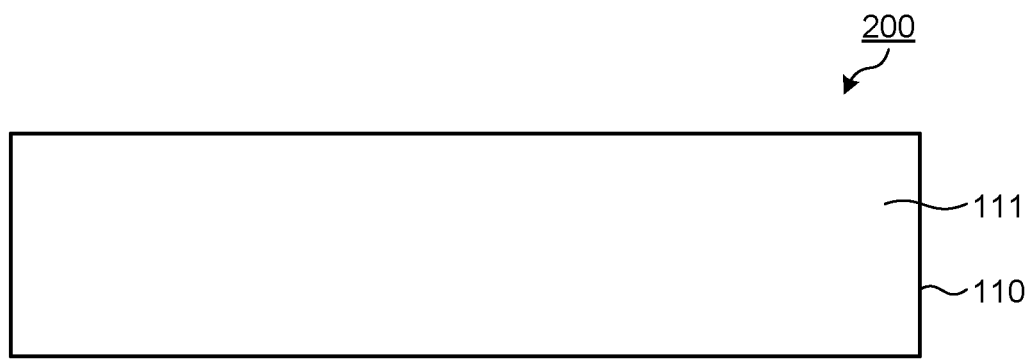
FIG. 7 is a schematic plan view of the display medium according to the second embodiment of the present invention as viewed from one side (an opposite side to the side with the second reflective layer).
Figure 8:
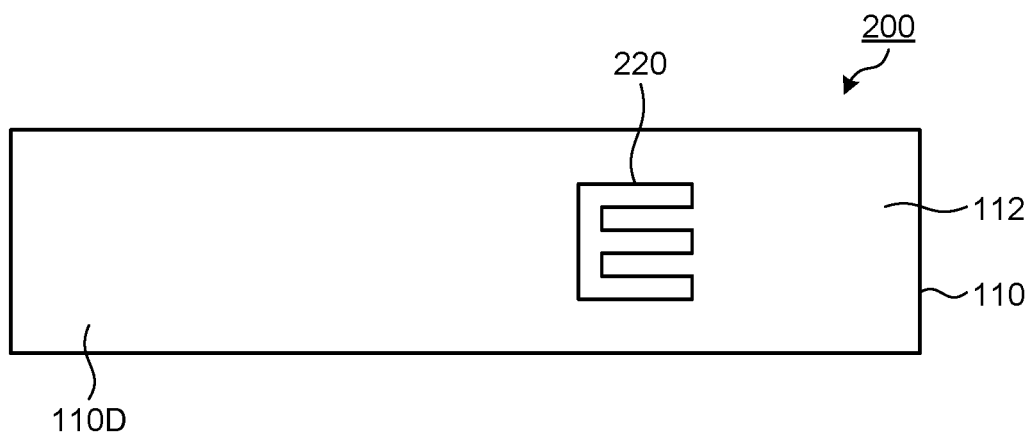
FIG. 8 is a schematic plan view of the display medium according to the second embodiment of the present invention as viewed from the other side (the side with the second reflective layer).

FIG. 6 is a cross-sectional view schematically illustrating a display medium 200 according to a second embodiment of the present invention. FIG. 7 is a schematic plan view of the display medium 200 according to the second embodiment of the present invention as viewed from one side (an opposite side to the side with the second reflective layer 220). FIG. 8 is a schematic plan view of the display medium 200 according to the second embodiment of the present invention as viewed from the other side (the side with the second reflective layer 220).

As illustrated in FIGS. 6 to 8, the display medium 200 according to the second embodiment of the present invention includes: a multilayered substrate 110 including a polarized light separation layer 111 and a phase difference layer 112; and a second reflective layer 220 which serves as a reflective layer and which is provided on the surface 110D of the multilayered substrate 110 on the side with the phase difference layer.

The multilayered substrate 110 included in the display medium 200 according to the second embodiment may be the same as that included in the display medium 100 according to the first embodiment. In the display medium 200 according to the second embodiment, when the same multilayered substrate as described in the first embodiment is used as the multilayered substrate 110, the same advantageous effects as described in the first embodiment can be obtained.

The second reflective layer 220 which serves as a reflective layer is provided on the surface 110D of the multilayered substrate 110 on the side with the phase difference layer. As in the first reflective layer 120 described in the first embodiment, the second reflective layer 220 may be provided directly or indirectly on the surface 110D of the multilayered substrate 110.

The second reflective layer 220 may be provided on a part or the entirety of the surface 110D of the multilayered substrate 110. Usually, when viewed in the thickness direction, the second reflective layer 220 is provided to overlap with both the polarized light separation layer 111 and the phase difference layer 112 of the multilayered substrate 110, in the same manner as the first reflective layer 120 described in the first embodiment. In the present embodiment, the second reflective layer 220 having a planar shape of a character "E" will be described by illustrating an example. In this example, the entirety of the second reflective layer 220 overlaps with a part of the polarized light separation layer 111 and a part of the phase difference layer 112 of the multilayered substrate 110 when viewed in the thickness direction.

The second reflective layer 220 has a circularly polarized light separation function. Therefore, the second reflective layer 220 can reflect circularly polarized light having one rotation direction $D_{B2}$ and can transmit circularly polarized light having an opposite rotation direction to the rotation direction $D_{B2}$, in a wavelength range in which the second reflective layer 220 can exert the circularly polarized light separation function. In the following description, such a wavelength range in which the second reflective layer 220 can exert the circularly polarized light separation function may be referred to as a "second reflection wavelength range" as necessary. The range of the reflectance of the second reflective layer 220 for unpolarized light in the second reflection wavelength range may be the same as the range of reflectance of the first reflective layer 120 for unpolarized light in the first reflection wavelength range described in the first embodiment.

The second reflection wavelength range of the second reflective layer 220 usually overlaps with the polarized light separation wavelength range of the polarized light separation layer 111 included in the multilayered substrate 110. A part of the second reflection wavelength range and a part of the polarized light separation wavelength range may overlap with each other, the entirety of the second reflection wavelength range and a part of the polarized light separation wavelength range may overlap with each other, a part of the second reflection wavelength range and the entirety of the polarized light separation wavelength range may overlap with each other, and the entirety of the second reflection wavelength range and the entirety of the polarized light separation wavelength range may overlap with each other. Among these, the entirety of the second reflection wavelength range preferably overlaps with a part or the entirety of the polarized light separation wavelength range so that the second reflection wavelength range is within the polarized light separation wavelength range. Hence, preferably, the lower limit of the second reflection wavelength range is equal to or higher than the lower limit of the polarized light separation wavelength range, and the upper limit of the second reflection wavelength range is equal to or lower than the upper limit of the polarized light separation wavelength range. In this case, when the display medium 200 is observed from an opposite side to the second reflective layer 220, the visual recognizability for the second reflective layer 220 can effectively be lowered.

The rotation direction $D_{B2}$ of circularly polarized light that the second reflective layer 220 can reflect is set to be opposite to the rotation direction $D_A$ of circularly polarized light that the polarized light separation layer 111 can reflect. Therefore, in a case where light is transmitted through the multilayered substrate 110 and is incident onto the second reflective layer 220, the rotation direction $D_C$ of at least a part of circularly polarized light (specifically, circularly polarized light in the polarized light separation wavelength range) included in the light is opposite to the rotation direction $D_{B2}$ of circularly polarized light that the second reflective layer 220 can reflect. Accordingly, the second reflective layer 220 does not or substantially does not reflect light which has been transmitted through the multilayered substrate 110 and which is incident onto the second reflective layer 220.

Such a second reflective layer 220, as in the first reflective layer 120 described in the first embodiment, may be a layer of a cholesteric resin, and is preferably a layer including cholesteric resin flakes. When a layer including the cholesteric resin flakes is used as the second reflective layer 220, the same advantageous effects as those described in the first embodiment can be obtained.

Figure 9:
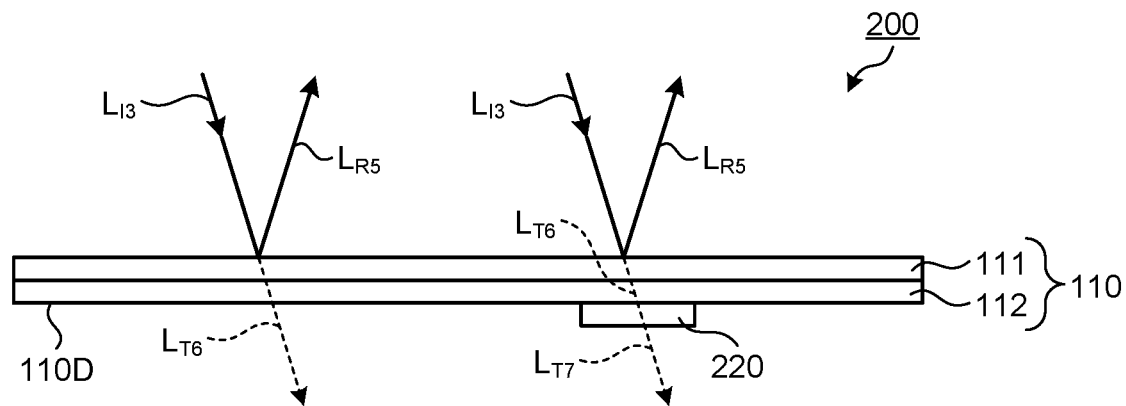
FIG. 9 is a cross-sectional view schematically illustrating the display medium according to the second embodiment of the present invention.
Figure 10:
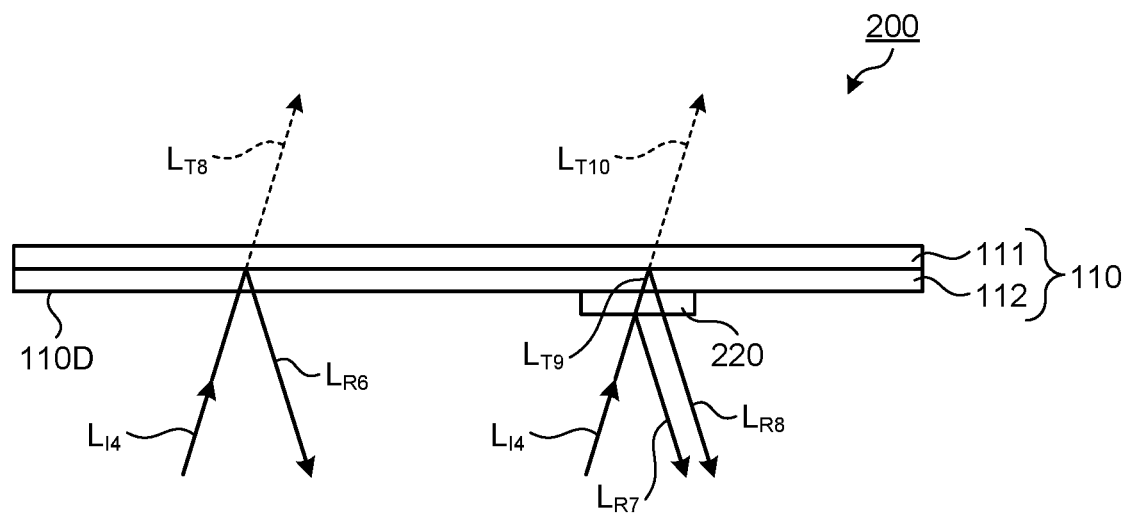
FIG. 10 is a cross-sectional view schematically illustrating the display medium according to the second embodiment of the present invention.

FIGS. 9 and 10 are each a cross-sectional view schematically illustrating the display medium 200 according to the second embodiment of the present invention. In FIGS. 9 and 10, paths of light reflected by the polarized light separation layer 111 and the second reflective layer 220 are schematically illustrated. Although various types of other light absorption and reflection may occur than those described below in the actual display medium 200, main light paths will schematically be described below for convenience of description of operations.

FIG. 9 illustrates a case where irradiation light $L_{I3}$, such as unpolarized light, including both clockwise circularly polarized light and counterclockwise circularly polarized light, is irradiated onto a surface of the display medium 200 on an opposite side to the second reflective layer 220. As illustrated in FIG. 9, in an area where the second reflective layer 220 is not provided, the irradiation light $L_{I3}$ is incident onto the polarized light separation layer 111 since the polarized light separation layer 111 and the phase difference layer 112 are disposed in this order. A part of the irradiation light $L_{I3}$ is reflected by the polarized light separation layer 111 as circularly polarized light $L_{R5}$ having the rotation direction $D_A$. Light $L_{T6}$ other than the reflected circularly polarized light $L_{R5}$ is transmitted through the polarized light separation layer 111, is transmitted through the phase difference layer 112 as well, and goes out of the display medium 200. Since the circularly polarized light $L_{R5}$ is reflected by the polarized light separation layer 111, a part or the entirety of the light $L_{T6}$ that has been transmitted through the polarized light separation layer 111 is circularly polarized light which has an opposite rotation direction to the rotation direction $D_A$ at the time immediately after being transmitted through the polarized light separation layer 111. However, since the part or the entirety of the light $L_{T6}$ is transmitted through the phase difference layer 112 to cause the rotation direction thereof to be inverted, a part or the entirety of circularly polarized light included in the light $L_{T6}$ after being transmitted through the phase difference layer 112 is circularly polarized light which has the same rotation direction as the rotation direction $D_A$.

As illustrated in FIG. 9, since the polarized light separation layer 111, the phase difference layer 112, and the second reflective layer 220 are arranged in this order in an area where the second reflective layer 220 is provided, a part of the irradiation light $L_{I3}$ is reflected by the polarized light separation layer 111 as the circularly polarized light $L_{R5}$ having the rotation direction $D_A$, and light $L_{T6}$ other than the reflected circularly polarized light $L_{R5}$ is transmitted through the polarized light separation layer 111 and the phase difference layer 112, as in the area where the second reflective layer 220 is not provided. The light $L_{T6}$ that has been transmitted through the phase difference layer 112 is then incident onto the second reflective layer 220. However, the rotation direction of a part or the entirety of the circularly polarized light included in the light $L_{T6}$ after being transmitted through the phase difference layer 112 is the same as the rotation direction $D_A$ of the circularly polarized light $L_{R5}$ reflected by the polarized light separation layer 111. Herein, the rotation direction $D_{B2}$ of circularly polarized light that the second reflective layer 220, which serves as the reflective layer according to the present embodiment, can reflect is in an opposite direction to the rotation direction $D_A$ of the circularly polarized light $L_{R5}$ to be reflected by the polarized light separation layer 111. Therefore, the light $L_{T6}$ which is incident onto the second reflective layer 220 includes none or just a small quantity of circularly polarized light which has the rotation direction $D_{B2}$ that the second reflective layer 220 can reflect. Thus, the entire or most of the light $L_{T6}$ is not reflected by the second reflective layer 220. Since the rotation direction $D_{B2}$ of circularly polarized light that the second reflective layer 220 can reflect is opposite to the rotation direction $D_A$ of circularly polarized light that the polarized light separation layer 111 can reflect, a part or the entirety of the light $L_{T7}$ which is transmitted through the second reflective layer 220 and goes out of the displaying medium 200 is circularly polarized light having the same rotation direction as the rotation direction $D_A$, even in the area where the second reflective layer 220 is provided, as in the area where the second reflective layer 220 is not provided.

In this manner, in a case where the surface of the display medium 200 on an opposite side to the second reflective layer 220 is irradiated with the irradiation light $L_{I3}$ including both clockwise circularly polarized light and counterclockwise circularly polarized light, and is observed, light reflection does not occur or occurs only slightly on the second reflective layer 220. Thus the observer cannot visually recognize light reflected by the second reflective layer 220. Accordingly, the observer observing the display medium 200 from the opposite side to the second reflective layer 220 cannot visually recognize the image of the second reflective layer 220 as illustrated in FIG. 7.

FIG. 10 illustrates a case where irradiation light $L_{I4}$, such as unpolarized light, including both clockwise circularly polarized light and counterclockwise circularly polarized light is irradiated onto a surface of the display medium 200 on the side with the second reflective layer 220. As illustrated in FIG. 10, in an area where the second reflective layer 220 is not provided, the irradiation light $L_{I4}$ is transmitted through the phase difference layer 112 of the multilayered substrate 110 and is then incident onto the polarized light separation layer 111. A part of the irradiation light $L_{I4}$ is reflected by the polarized light separation layer 111 as circularly polarized light $L_{R6}$ having the rotation direction $D_A$, and is transmitted through the phase difference layer 112 to cause the rotation direction thereof to be inverted. Light $L_{T8}$ other than the reflected circularly polarized Light $L_{R6}$ is transmitted through the polarized light separation layer 111, and goes out of the display medium 200. Since the circularly polarized light $L_{R6}$ is reflected by the polarized light separation layer 111, a part or the entirety of the light $L_{T8}$ transmitted through the polarized light separation layer 111 and which goes out of the display medium 200 is circularly polarized light which has an opposite rotation direction to the rotation direction $D_A$.

As illustrated in FIG. 10, in an area where the second reflective layer 220 is provided, the irradiation light $L_{I4}$ is incident onto the second reflective layer 220. A part of the circularly polarized light included in the irradiation light $L_{I4}$ is reflected by the second reflective layer 220 as circularly polarized light $L_{R7}$ which has the rotation direction $D_{B2}$. Light $L_{T9}$ other than the reflected circularly polarized light $L_{R7}$ is transmitted through the phase difference layer 112 and is incident onto the polarized light separation layer 111. The incident light $L_{T9}$ may include circularly polarized light $L_{R8}$ having the rotation direction $D_A$ that the polarized light separation layer 111 can reflect. Therefore, a part of the light $L_{T9}$ may be reflected by the polarized light separation layer 111 as the circularly polarized light $L_{R8}$ which has the rotation direction $D_A$. Light $L_{T19}$ other than the reflected circularly polarized light $L_{R7}$ and $L_{R8}$ is transmitted through the polarized light separation layer 111 and goes out of the display medium 200. As in the area where the second reflective layer 220 is not provided, since the light $L_{T10}$ is transmitted through the polarized light separation layer 111 and then goes out of the display medium 200, a part or the entirety of the light $L_{T10}$ going out of the display medium 200 after being transmitted through the polarized light separation layer 111 is circularly polarized light which has an opposite rotation direction to the rotation direction $D_A$.

In this manner, in a case where the surface of the display medium 200 on the side with the second reflective layer 220 is irradiated with the irradiation light $L_{I4}$, including both clockwise circularly polarized light and counterclockwise circularly polarized light, and is observed, an observer can visually recognize the circularly polarized light $L_{R7}$ reflected by the second reflective layer 220 since strong light reflection occurs on the second reflective layer 220. Accordingly, the observer observing the display medium 200 from the side with the second reflective layer 220 can visually recognize the image of the second reflective layer 220 as illustrated in FIG. 8.

Accordingly, in the display medium 200 according to the present embodiment, the second reflective layer 220 can be visually recognized when the display medium 200 is observed from the side with the second reflective layer 220. However, although the multilayered substrate 110 is transparent or semi-transparent, the second reflective layer 220 cannot be visually recognized when the display medium 200 is observed from the opposite side to the second reflective layer 220. Therefore, the display medium 200 can provide a specific display mode in which an image of the display medium which can be visually recognized when the front surface is observed and an image of the display medium which can be visually recognized when the back surface is observed can be different from each other although the multilayered substrate 110 is transparent or semi-transparent. Furthermore, with the display medium 200 according to the present embodiment, the same advantageous effects as those of the display medium 100 described in the first embodiment can be obtained.

4. Third Embodiment of Display Medium

In the first embodiment and the second embodiment, examples were shown in which the first reflective layer 120 or the second reflective layer 220 which serves as the reflective layer is provided on one surface 110U or 110D of the multilayered substrate 110. However, the display medium may have reflective layers on both surfaces of the display medium. Hereinafter, an embodiment in which a first reflective layer and a second reflective layer serving as reflective layers are provided on both surfaces of the multilayered substrate 110 will be described.

Figure 11:
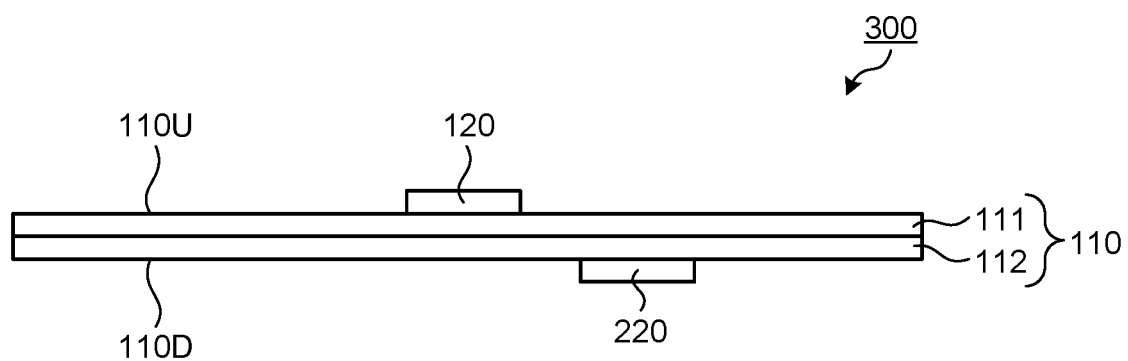
FIG. 11 is a cross-sectional view schematically illustrating a display medium according to a third embodiment of the present invention.
Figure 12:
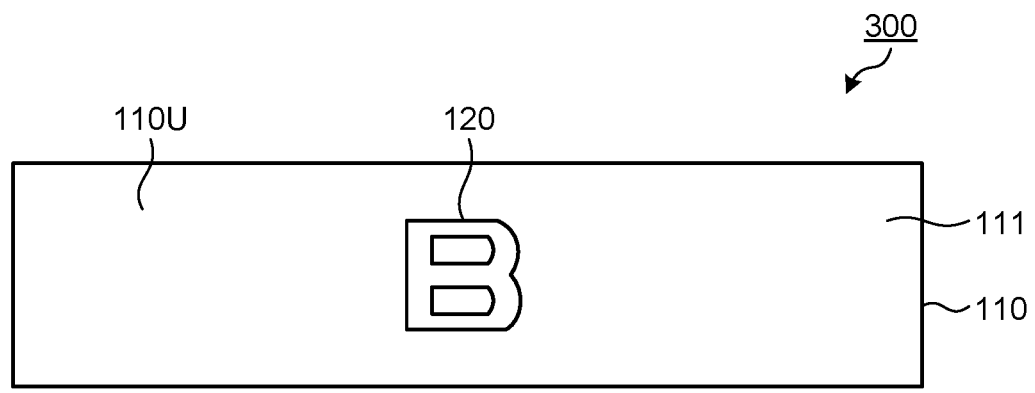
FIG. 12 is a schematic plan view of the display medium according to the third embodiment of the present invention as viewed from one side (a side with a first reflective layer).
Figure 13:
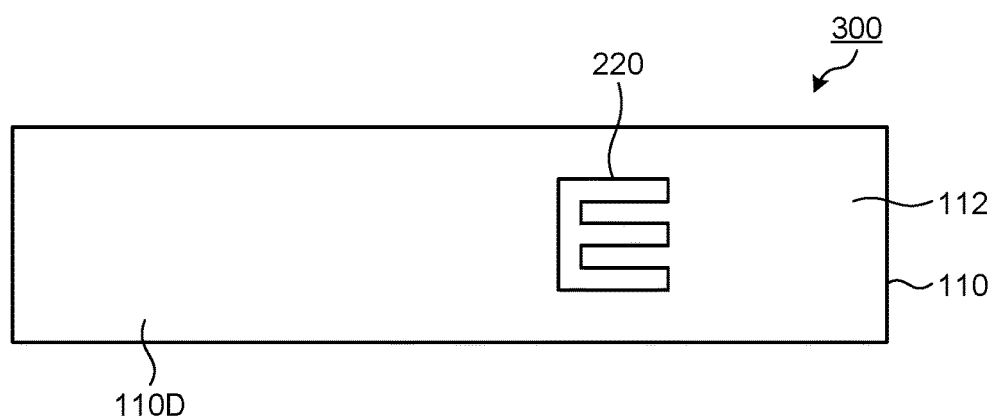
FIG. 13 is a schematic plan view of the display medium according to the third embodiment of the present invention as viewed from the other side (a side with a second reflective layer).

FIG. 11 is a cross-sectional view schematically illustrating a display medium 300 according to a third embodiment of the present invention. FIG. 12 is a schematic plan view of the display medium 300 according to the third embodiment of the present invention as viewed from one side (a side with the first reflective layer 120). FIG. 13 is a schematic plan view of the display medium 300 according to the third embodiment of the present invention as viewed from the other side (a side with the second reflective layer 220).

As illustrated in FIGS. 11 to 13, the display medium 300 according to the third embodiment of the present invention includes: a multilayered substrate 110 including a polarized light separation layer 111 and a phase difference layer 112; a first reflective layer 120 which serves as a reflective layer and which is provided on the surface 110U of the multilayered substrate 110 on the side with the polarized light separation layer; and a second reflective layer 220 which serves as a reflective layer and which is provided on the surface 110D of the multilayered substrate 110 on the side with the phase difference layer.

The multilayered substrate 110 included in the display medium 300 according to the third embodiment may be the same as that included in the display medium 100 according to the first embodiment. In the display medium 300 according to the third embodiment, when the same multilayered substrate as described in the first embodiment is used as the multilayered substrate 110, the same advantageous effects as described in the first embodiment can be obtained.

The first reflective layer 120 included in the display medium 300 according to the third embodiment may be the same as that included in the display medium 100 according to the first embodiment. In the display medium 300 according to the third embodiment, when the same first reflective layer as described in the first embodiment is used as the first reflective layer 120, the same advantageous effects as described in the first embodiment can be obtained.

The second reflective layer 220 included in the display medium 300 according to the third embodiment may be the same as that included in the display medium 200 according to the second embodiment. In the display medium 300 according to the third embodiment, when the same second reflective layer as described in the second embodiment is used as the second reflective layer 220, the same advantageous effects as described in the second embodiment can be obtained.

The first reflective layer 120 of the display medium 300 can be visually recognized by an observer observing the display medium 300 from the side with the first reflective layer 120 under irradiation light including both clockwise circularly polarized light and counterclockwise circularly polarized light by the same mechanism as described in the first embodiment (FIG. 12). Furthermore, the first reflective layer 120 cannot be visually recognized by the observer observing the display medium 300 from the side with the second reflective layer 220 as the opposite side to the first reflective layer 120 (FIG. 13). On the other hand, the second reflective layer 220 of the display medium 300 can be visually recognized by the observer observing the display medium 300 from the side with the second reflective layer 220 under irradiation light including both clockwise circularly polarized light and counterclockwise circularly polarized light by the same mechanism as described in the second embodiment (FIG. 13). Furthermore, the second reflective layer 220 cannot be visually recognized by the observer observing the display medium 300 from the side with the first reflective layer 120 as the opposite side to the second reflective layer 220 (FIG. 12). Accordingly, the display medium 300 according to the present embodiment can provide a special display mode in which an image of the display medium which can be visually recognized when the front surface is observed and an image of the display medium which can be visually recognized when the back surface is observed can be different from each other although the multilayered substrate 110 is transparent or semi-transparent. Furthermore, with the display medium 300 according to the present embodiment, the same advantageous effects as those of the display media 100 and 200 described in the first embodiment and the second embodiment can be obtained.

When a plurality of reflective layers 120 and 220 are provided to the display medium 300 as in the present embodiment, the shape, sizes, and materials of the reflective layers, and the wavelength and reflectance of the circularly polarized light reflected by the reflective layers may be the same as or different from each other.

5. Modified Examples of Display Media

The display medium is not limited to those described in the first to third embodiments described above. For example, the display medium may further include optional elements in combination with the multilayered substrate 110 and the reflective layers such as the first reflective layer 120 and the second reflective layer 220 described above.

For example, in addition to the first reflective layer 120 and the second reflective layer 220, the display medium may include an optional layer having a circularly polarized light separation function on the surfaces 110U and 110D of the multilayered substrate 110. As a specific example, on the surface 110U of the multilayered substrate 110 on the side with the polarized light separation layer, a first optional layer may be provided which can reflect circularly polarized light having an opposite rotation direction $D_{E1}$ to the rotation direction $D_A$ of the circularly polarized light that the polarized light separation layer 111 can reflect, and which can transmit circularly polarized light having an opposite rotation direction to the rotation direction $D_{E1}$. Furthermore, as another specific example, on the surface 110D of the multilayered substrate 110 on the side with the phase difference layer, a second optional layer may be provided which can reflect circularly polarized light having the same rotation direction $D_{E2}$ as the rotation direction $D_A$ of the circularly polarized light that the polarized light separation layer 111 can reflect, and which can transmit circularly polarized light having an opposite rotation direction to the rotation direction $D_{E2}$. These optional layers may be formed, for example, as a layer of the cholesteric resin, a layer including the cholesteric resin flakes, and the like. Usually, these optional layers can be visually recognized when the front surface is observed and when the back surface is observed.

Furthermore, for example, the display medium may include an optional non-chiral layer including a colorant, such as a pigment and a dye, with no circularly polarized light separation function. The non-chiral layer may be provided on the surface 110U of the multilayered substrate 110 on the side with the polarized light separation layer, or may be provided on the surface 110D on the side with the phase difference layer. Usually, this non-chiral layer can be visually recognized when the front surface is observed and when the back surface is observed.

Furthermore, for example, the display medium may include an adhesive layer for bonding the above-described layers together. As a specific example, the display medium may include an adhesive layer between the multilayered substrate 110 and the first reflective layer 120, and may include an adhesive layer between the multilayered substrate 110 and the second reflective layer 220. It is preferable that the adhesive layer has a small in-plane retardation in the same manner as the optional layer that the multilayered substrate 110 may include.

Furthermore, for example, the display medium may include a cover layer which protects each of the above-described layers. These cover layers are preferably provided on an outer side of the layers described above. As a specific example, the display medium may include a cover layer, a second reflective layer, a multilayered substrate, a first reflective layer, and a cover layer in this order in the thickness direction. Such a cover layer may be formed of a transparent material and may be formed of, for example, a resin.

Furthermore, for example, the display medium may include an optional layer having a small in-plane retardation between the respective layers described above and as an outermost layer of the display medium as long as the advantageous effects of the present invention are not significantly impaired. Such an optional layer having a small in-plane retardation may be referred to as a "low Re layer" hereinafter. The specific in-plane retardation of the low Re layer is usually 0 nm or more and 5 nm or less. Examples of the position where the low Re layer is provided may include, but are not limited to, a position on the first reflective layer on an opposite side to the multilayered substrate, a position between the first reflective layer and the multilayered substrate, a position between the polarized light separation layer and the phase difference layer, a position between the multilayered substrate and the second reflective layer, and a position on the second reflective layer on an opposite side to the multilayered substrate. The low Re layer preferably has a high light transmittance, and the total light transmittance of the low Re layer is preferably 80% or more, and more preferably 85% or more. Examples of the material of the low Re layer may include hard polyvinyl chloride, soft polyvinyl chloride, acrylic resin, glass, polycarbonate (PC), and polyethylene terephthalate (PET). The specific materials may be appropriately selected according to use applications of the display medium, and required texture, durability, and mechanical strength.

6. Fourth Embodiment of Display Set

The display medium described above may be combined with a display article that is to be observed through the display medium, and the combination may be used as a display set. The display article to be combined with the display medium includes a foundation article and a display layer provided on the foundation article. The display layer is a layer having a circularly polarized light separation function, and can reflect circularly polarized light having one rotation direction $D_D$ and can transmit circularly polarized light having an opposite rotation direction to the rotation direction $D_D$. Therefore, a part or the entirety of the circularly polarized light reflected from the display layer, which has the rotation direction $D_D$, can be transmitted through the multilayered substrate of the display medium in one order of (i) and (ii) described below, and cannot be transmitted therethrough in the other order.

(i) Order of polarized light separation layer and phase difference layer.

(ii) Order of phase difference layer and polarized light separation layer.

Therefore, according to the display set, an image of the display article which can be visually recognized through the display medium can differ depending on the direction of the display medium, the front facing direction or the back facing direction. Furthermore, as described above, the display medium itself can also make the image of the display medium, which can be visually recognized, differ depending on the direction of the display medium, the front facing direction or the back facing direction. Hereinafter, an embodiment of the display set will be described in detail with reference to the drawings.

Figure 14:
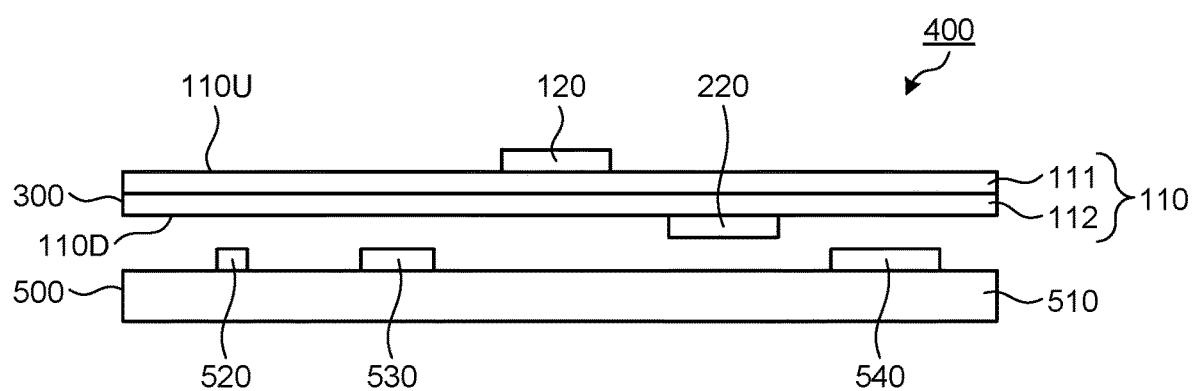
FIG. 14 is a cross-sectional view schematically illustrating a display set according to a fourth embodiment of the present invention.

FIG. 14 is a cross-sectional view schematically illustrating a display set 400 according to a fourth embodiment of the present invention. As illustrated in FIG. 14, the display set 400 according to the fourth embodiment of the present invention includes a display medium 300 and a display article 500. The present embodiment will be described by illustrating the display set 400 including the display medium 300 described in the third embodiment as an example.

Figure 15:
FIG. 15 is a cross-sectional view schematically illustrating a display article included in the display set according to the fourth embodiment of the present invention.
Figure 16:
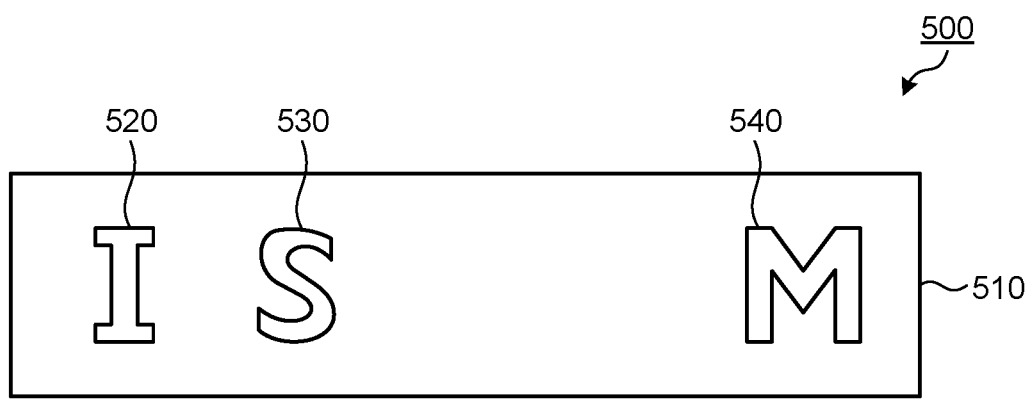
FIG. 16 is a plan view schematically illustrating the display article included in the display set according to the fourth embodiment of the present invention.

FIG. 15 is a cross-sectional view schematically illustrating a display article 500 included in the display set 400 according to the fourth embodiment of the present invention. FIG. 16 is a plan view schematically illustrating the display article 500 included in the display set 400 according to the fourth embodiment of the present invention. As illustrated in FIGS. 15 and 16, the display article 500 includes a foundation article 510, and a first display layer 520 and a second display layer 530 as display layers provided on the foundation article 510.

The foundation article 510 is an article on which display layers such as the first display layer 520 and the second display layer 530 are provided, and its range is not limited. Examples of the foundation article 510 may include, but are not limited to, cloth products such as clothing; leather products such as bags and shoes; metal products such as screws; paper products such as price tags; plastic products such as cards and plastic banknotes; and rubber products such as tires.

The first display layer 520 and the second display layer 530 as the display layers each have a circularly polarized light separation function. In the present embodiment, an example is shown in which the rotation direction $D_{D1}$ of the circularly polarized light that the first display layer 520 can reflect is opposite to the rotation direction $D_{D2}$ of the circularly polarized light that the second display layer 530 can reflect. More specifically, the first display layer 520 reflects circularly polarized light having the same rotation direction $D_{D1}$ as the rotation direction $D_A$ of circularly polarized light that the polarized light separation layer 111 included in the display medium 300 can reflect, and can transmit circularly polarized light having an opposite rotation direction to the rotation direction $D_{D1}$, in a wavelength range in which the first display layer 520 can exert the circularly polarized light separation function. On the other hand, the second display layer 530 reflects circularly polarized light having the opposite rotation direction $D_{D2}$ to the rotation direction $D_A$ of the circularly polarized light that the polarized light separation layer 111 can reflect, and can transmit circularly polarized light having an opposite rotation direction to the rotation direction $D_{D2}$, in a wavelength range in which the second display layer 530 can exert the circularly polarized light separation function.

In the following description, the wavelength range in which the first display layer 520 can exert the circularly polarized light separation function may be appropriately referred to as a "first display wavelength range". The wavelength range in which the second display layer 530 can exert the circularly polarized light separation function may be appropriately referred to as a "second display wavelength range". Furthermore, the first and second display wavelength ranges may be inclusively referred to as a "display wavelength range". The range of reflectance of the first display layer 520 and the second display layer 530 for unpolarized light in the display wavelength range may be the same as the range of reflectance of the polarized light separation layer 111 for unpolarized light in the polarized light separation wavelength range. At this time, the reflectance of the first display layer 520 and the reflectance of the second display layer 530 may be the same as, or different from, each other.

The display wavelength range of the first display layer 520 and the second display layer 530 generally overlaps with the polarized light separation wavelength range of the polarized light separation layer 111 included in the display medium 300. A part of the display wavelength range and a part of the polarized light separation wavelength range may overlap with each other, the entirety of the display wavelength range and a part of the polarized light separation wavelength range may overlap with each other, a part of the display wavelength range and the entirety of the polarized light separation wavelength range may overlap with each other, and the entirety of the display wavelength range and the entirety of the polarized light separation wavelength range may overlap with each other. Among these, the entirety of the display wavelength range preferably overlaps with a part or the entirety of the polarized light separation wavelength range so that the display wavelength range is within the polarized light separation wavelength range. Therefore, preferably, the lower limit of the display wavelength range is equal to or more than the lower limit of the polarized light separation wavelength range, and the upper limit of the display wavelength range is equal to or less than the upper limit of the polarized light separation wavelength range. In this case, when the direction of the display medium 300, the front facing direction or the back facing direction, is suitably set, the multilayered substrate 110 can effectively blocked the circularly polarized light reflected by the first display layer 520 or the second display layer 530.

These first display layer 520 and second display layer 530, as in the first reflective layer 120 described in the first embodiment, may be a layer of a cholesteric resin, and is preferably a layer including the cholesteric resin flakes.

In the present embodiment, the display article 500 in which the first display layer 520 having the planar shape of the character "I" and the second display layer 530 having the planar shape of the character "S" are provided on the sheet-shaped foundation article 510 will be described as an example.

Furthermore, the display article 500 may include an optional non-chiral layer 540 including a colorant, such as a pigment and a dye, with no circularly polarized light separation function, as necessary. In this embodiment, the non-chiral layer 540 having a planar shape of the character "M" will be described as an example.

The display set 400 includes a combination of the display medium 300 and the display article 500 with the above-described configuration. Therefore, an observer can visually recognize the image described below.

As illustrated in FIG. 14, a case will be described in which the display medium 300 and the display article 500 are overlapped with each other in such a manner that the surface 110D of the multilayered substrate 110 on the side with the phase difference layer 112 is directed to the display article 500. In this case, an observer usually observes the display set 400 from above in the drawing. Therefore, the observer observes the display medium 300 from the side with the first reflective layer 120 and also simultaneously observes the display article 500 through the display medium 300.

Figure 17:
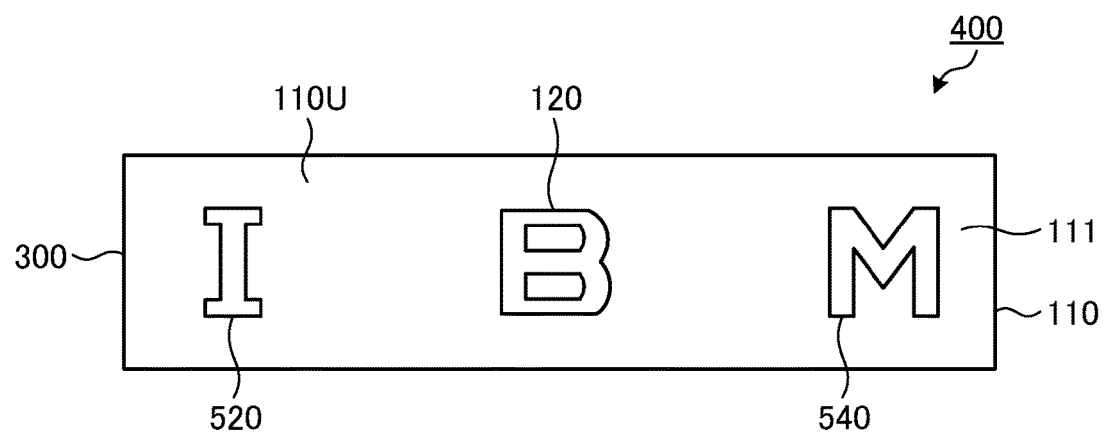
FIG. 17 is a plan view schematically illustrating an image which can be visually recognized when the display set illustrated in FIG. 14 is observed from above in the drawing.

FIG. 17 is a plan view schematically illustrating an image which can be visually recognized when the display set 400 illustrated in FIG. 14 is observed from above in the drawing. As illustrated in FIG. 17, the first reflective layer 120 of the display medium 300 and the first display layer 520 and the non-chiral layer 540 of the display article 500 appear in the image observed by the observer who observes the display set 400 as described above. However, the second reflective layer 220 of the display medium 300 and the second display layer 530 of the display article 500 do not appear. The mechanism for visually recognizing such an image is as follows.

When the display medium 300 is disposed to be directed in a direction illustrated in FIG. 14, the polarized light separation layer 111, the phase difference layer 112, and the display article 500 are arranged in this order in the thickness direction of the display medium 300. Therefore, out of irradiation light irradiated onto the display medium 300, a part of circularly polarized light is reflected by the polarized light separation layer 111, and light other than the reflected circularly polarized light is transmitted through the phase difference layer 112. Then, the light is incident onto the display article 500. A part or the entirety of the light which is incident onto the displaying article 500 is circularly polarized light having the same rotation direction as the rotation direction $D_A$ of the circularly polarized light reflected by the polarized light separation layer 111 (see the light $L_{T1}$ and $L_{T3}$ in FIG. 4 and the light $L_{T6}$ and $L_{T7}$ in FIG. 9).

Thus, on the first display layer 520 capable of reflecting circularly polarized light having the same rotation direction $D_{D1}$ as the rotation direction $D_A$, strong reflection of light which has been transmitted through the display medium 300 and which is incident onto the display article 500 occurs. Since the reflected light is circularly polarized light having the rotation direction $D_{D1}$, the rotation direction thereof is inverted by passing through the phase difference layer 112, so that the reflected light is able to be transmitted through the polarized light separation layer 111. Therefore, since the strong light reflected by the first display layer 520 can be transmitted through the display medium 300, an observer can visually recognize the image of the first display layer 520.

Furthermore, on the second display layer 530 capable of reflecting circularly polarized light having the opposite rotation direction $D_{D2}$ to the rotation direction $D_A$, reflection of the light which has been transmitted through the display medium 300 and which is incident onto the display article 500 does not occur or occurs only slightly. Even if light is reflected by the second display layer 530, since the reflected light is circularly polarized light having the rotation direction $D_{D2}$, the rotation direction thereof is inverted by passing through the phase difference layer 112, and a part or the entirety of the light is reflected by the polarized light separation layer 111. Thus, since there is no light or weak light that can be reflected by the second display layer 530 and be transmitted through the display medium 300, an observer cannot visually recognize the image of the second display layer 530.

Furthermore, the non-chiral layer 540 reflects light without depending on the polarization state of the light which is incident onto the display article 500. Accordingly, since a part or the entirety of the reflected light can be transmitted through the display medium 300, an observer can visually recognize the image of the non-chiral layer 540.

In addition, as described in the first to third embodiments, an observer can visually recognize the image of the first reflective layer 120 which is observed without through the multilayered substrate 110, and cannot visually recognize the image of the second reflective layer 220 observed through the multilayered substrate 110.

Thus, an observer can visually recognize the image shown by the first reflective layer 120 (character "B"), the image shown by the first display layer 520 (character "I") and the layer shown by the non-chiral layer 540 (character "M") as illustrated in FIG. 17, and cannot visually recognize the image of the second reflective layer 220 and the image of the second display layer 530.

Figure 18:
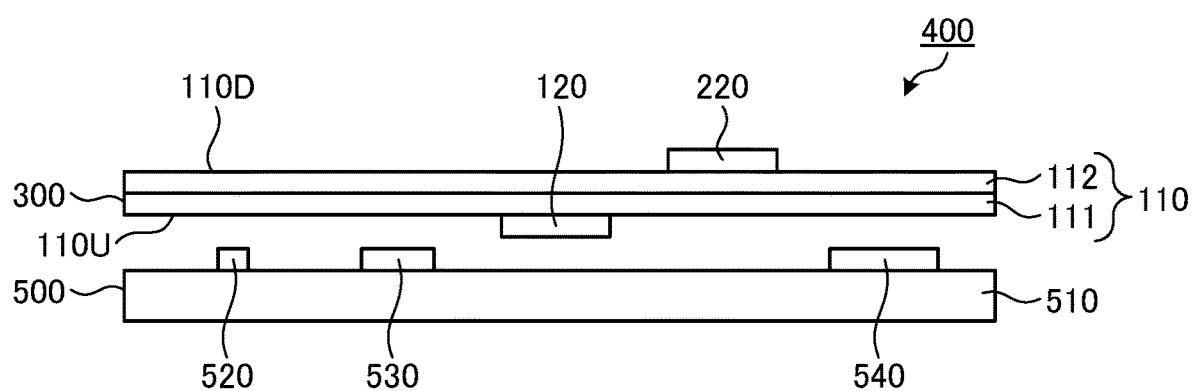
FIG. 18 is a cross-sectional view schematically illustrating the display set according to the fourth embodiment of the present invention.

Next, a case where the display medium 300 is turned over will be described. FIG. 18 is a cross-sectional view schematically illustrating a display set 400 according to a fourth embodiment of the present invention. In this case, as illustrated in FIG. 18, the display medium 300 and the display article 500 are overlapped with each other in such a manner that the surface 110U of the multilayered substrate 110 on the side with the polarized light separation layer 111 is directed to the display article 500. In this case, an observer usually observes the display set 400 from above in the drawing. Therefore, the observer observes the display medium 300 from the side with the second reflective layer 220 and also simultaneously observes the display article 500 through the display medium 300.

Figure 19:
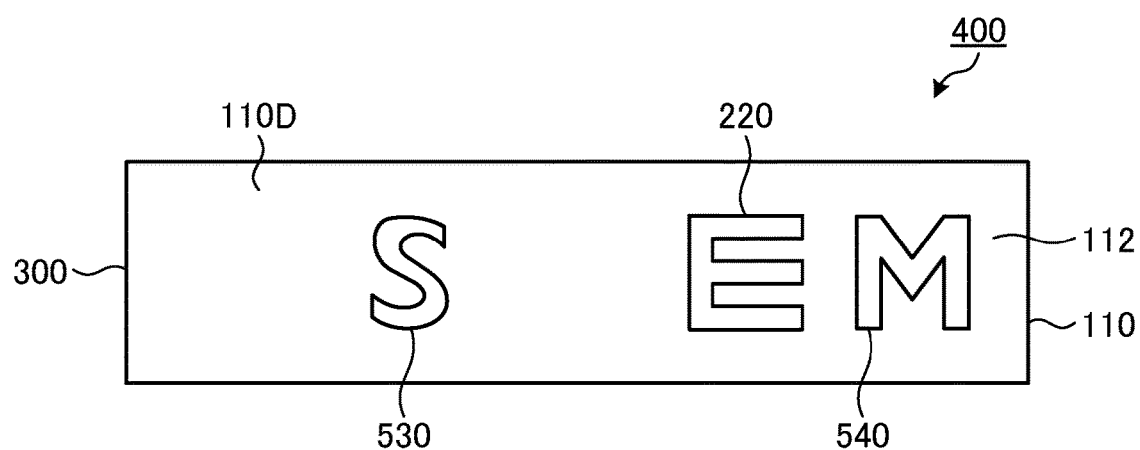
FIG. 19 is a plan view schematically illustrating an image which can be visually recognized when the display set illustrated in FIG. 18 is observed from above in the drawing.

FIG. 19 is a plan view schematically illustrating an image which can be visually recognized when the display set 400 illustrated in FIG. 18 is observed from above in the drawing. As illustrated in FIG. 19, the second reflective layer 220 of the display medium 300 and the second display layer 530 and the non-chiral layer 540 of the display article 500 appear in the image visually recognized by the observer who observes the display set 400 as described above. However, the first reflective layer 120 of the display medium 300 and the first display layer 520 of the display article 500 do not appear. The mechanism for visually recognizing such an image is as follows.

When the display medium 300 is disposed to be directed in a direction illustrated in FIG. 18, the phase difference layer 112, the polarized light separation layer 111, and the display article 500 are arranged in this order in the thickness direction of the display medium 300. Therefore, the irradiation light irradiated onto the display medium 300 is transmitted through the phase difference layer 112, and a part of the circularly polarized light is reflected by the polarized light separation layer 111. Then, the light is incident onto the display article 500. A part or the entirety of the light which is incident onto the display article 500 is circularly polarized light having an opposite rotation direction to the rotation direction $D_A$ of the circularly polarized light reflected by the polarized light separation layer 111 (see the light $L_{T4}$ and $L_{T5}$ in FIG. 5 and the light $L_{T8}$ and $L_{T10}$ in FIG. 10).

Thus, on the first display layer 520 capable of reflecting circularly polarized light having the same rotation direction $D_{D1}$ as the rotation direction $D_A$, reflection of the light which has been transmitted through the display medium 300 and which is incident onto the display article 500 does not occur or occurs only slightly. Even if light is reflected by the first display layer 520, since the reflected light is circularly polarized light having the rotation direction $D_{D1}$, a part or the entirety of the light is reflected by the polarized light separation layer 111. Therefore, since there is no light or weak light that can be reflected by the first display layer 520 and be transmitted through the display medium 300, an observer cannot visually recognize the image of the first display layer 520.

Furthermore, on the second display layer 530 capable of reflecting circularly polarized light having the opposite rotation direction $D_{D2}$ to the rotation direction $D_A$, strong reflection of light which has been transmitted through the display medium 300 and which is incident onto the display article 500 occurs. Since the reflected light is circularly polarized light having the rotation direction $D_{D2}$, the light can be transmitted through the polarized light separation layers 111. Therefore, since the strong light reflected by the second display layer 530 can be transmitted through the display medium 300, an observer can visually recognize the image of the second display layer 530.

Furthermore, the non-chiral layer 540 reflects light without depending on the polarization state of the light which is incident onto the display article 500. Accordingly, since a part or the entirety of the reflected light can be transmitted through the display medium 300, an observer can visually recognize the image of the non-chiral layer 540.

In addition, as described in the first to third embodiments, an observer can visually recognize the image of the second reflective layer 220 which is observed without through the multilayered substrate 110, and cannot visually recognize the image of the first reflective layer 120 observed through the multilayered substrate 110.

Thus, an observer can visually recognize the image shown by the second reflective layer 220 (character "E"), the image shown by the second display layer 530 (character "S"), and the layer shown by the non-chiral layer 540 (character "M") as illustrated in FIG. 19, and cannot visually recognize the image of the first reflective layer 120 and the image of the first display layer 520.

As described above, in the display set according to the present embodiment, an image which can be visually recognized can differ depending on direction of the display medium 300. Therefore, by utilizing a combination of such different images, a novel display mode that has not yet been achieved, can be achieved, and a complex and highly-flexible design can be produced. In particular, in an environment under irradiation light including both clockwise circularly polarized light and counterclockwise circularly polarized light, although the multilayered substrate 110 of the display medium 300 is transparent or semi-transparent, the occurrence of a difference in image as described above depending on direction of the display medium 300 can provide an unexpected display for general observers, and therefore, it can be expected that a great impact is given to the observers.

Although the display article 500 including both the first display layer 520 and the second display layer 530 has been described as an example in the fourth embodiment, a display article including at least one of the first display layer 520 and the second display layer 530 may be adopted. For example, a display article may be used which includes one or more first display layers 520 and no second display layer 530. Also, for example, a display article may be used which includes one or more second display layers 530 and no first display layer 520.

EXAMPLE

Hereinafter, the present invention will be specifically described by illustrating Examples. However, the present invention is not limited to the Examples described below. The present invention may be optionally modified for implementation without departing from the scope of claims of the present invention and its equivalents.

In the following description, "%" and "part" representing quantity are on the basis of weight, unless otherwise specified. The operation described below was performed in under the conditions of normal temperature and normal pressure in the atmospher, unless otherwise specified.

In the following description, a transparent tackiness agent tape "LUCIACS CS9621T" (with a thickness of 25 μm, a visible-light transmittance of 90% or more, and an in-plane retardation of 3 nm or less) manufactured by Nitto Denko Corp. was used as the tackiness agent unless otherwise specified.

<Method for Measuring Reflectance of Layer of Cholesteric Resin>

A substrate film was removed from a multilayered film to obtain a layer of cholesteric resin. The reflectance of the layer of the cholesteric resin layer irradiated with unpolarized light (wavelength: 400 nm to 800 nm) was measured with use of an ultraviolet-visible spectrophotometer ("UV-Vis 550" manufactured by JASCO Corporation).

<Method for Measuring In-Plane Retardation>

In-plane retardation was measured at a measurement wavelength of 590 nm with use of a phase difference meter ("Axoscan" manufactured by Axometrics, Inc).

Production Example 1: Production of Layer of Cholesteric Resin Capable of Reflecting Clockwise Circularly Polarized Light 100 parts of a photopolymerizable liquid crystal compound represented by the following formula (X1), 25 parts of a photopolymerizable non-liquid crystal compound represented by the following formula (X2), 8 parts of a chiral agent ("LC756" manufactured by BASF Co.), 5 parts of a photopolymerization initiator ("Irgacure 907" manufactured by Ciba Japan Co.), 0.15 part of a surfactant ("S-420" manufactured by AGC Seimi Chemical Co.), and 320 parts of cyclopentanone as a solvent were mixed to prepare a liquid crystal composition.

[Chemical formula 1]

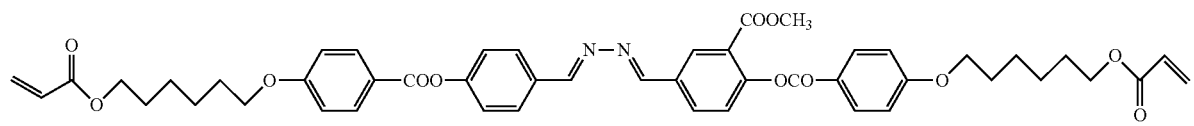

(X1)

[Chemical formula 2]

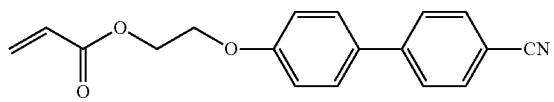

(X2)

As a substrate film, a long-length polyethylene terephthalate film ("A4100" manufactured by Toyobo Co.; thickness: 100 μm) was prepared. This substrate film was attached to a feeding unit of a film conveying apparatus, and the following operation was performed while the substrate film was conveyed in the lengthwise direction.

The surface of the substrate film was subjected to a rubbing treatment in the lengthwise direction parallel to the conveying direction. Next, the liquid crystal composition was applied onto the surface of the substrate film, which had been subjected to the rubbing treatment, using a die coater to form a layer of the liquid crystal composition. The layer of the liquid crystal composition was subjected to an orientation treatment by heating at 120° C. for 4 minutes. After that, the layer of the liquid crystal composition was subjected to a bandwidth broadening treatment. In this bandwidth broadening treatment, weak UV light irradiation at 5 mJ/cm² to 30 mJ/cm² and warming treatment at 100° C. to 120° C. were alternately repeated several times to control the reflection bandwidth to a desired bandwidth. After that, the layer of the liquid crystal composition was irradiated with ultraviolet light at 800 mJ/cm² to cure the layer of the liquid crystal composition. By doing so, a multilayered film including the substrate film and a layer of cholesteric resin was obtained. The reflectance of the layer of the cholesteric resin of this multilayered film was measured by the measurement method described above. As a result of the measurement, the layer of the cholesteric resin had a wavelength range of 450 nm to 700 nm in which the reflectance for unpolarized light was 40% or more.

Production Example 2: Production of Ink Containing Cholesteric Resin Flake Capable of Reflecting Clockwise Circularly Polarized Light From the multilayered film produced in Production Example 1, the layer of the cholesteric resin was peeled off. The peeled layer of the cholesteric resin was pulverized to obtain flakes. 10 parts of the flakes was mixed with 85 parts of a screen ink ("No. 2500 Medium" manufactured by Jujo Chemical Co.) and 5 parts of a dedicated diluent (Tetron standard solvent) of the screen ink to obtain an ink.

Production Example 3: Production of Ink Containing Cholesteric Resin Flake Capable of Reflecting Counterclockwise Circularly Polarized Light A multilayered film including a substrate film and a layer of cholesteric resin was obtained by performing the same operations as those in Production Example 1, except that the type of the chiral agent was changed to 20 parts of D-mannitol, 1,4:3,6-dihydro-,2,5-bis[4-[[[6-[[[4-[(1-oxo-2-propene-1-yl)oxy]butoxy]carbonyl]oxy]-2-naphthalenyl]carbonyl]oxy]benzoate] represented by the formula (X3) below. The reflectance of the layer of the cholesteric resin of this multilayered film was measured by the measurement method described above. As a result of the measurement, the layer of the cholesteric resin had a wavelength range of 450 nm to 700 nm in which the reflectance for unpolarized light was 40% or more.

[Chemical formula 3]

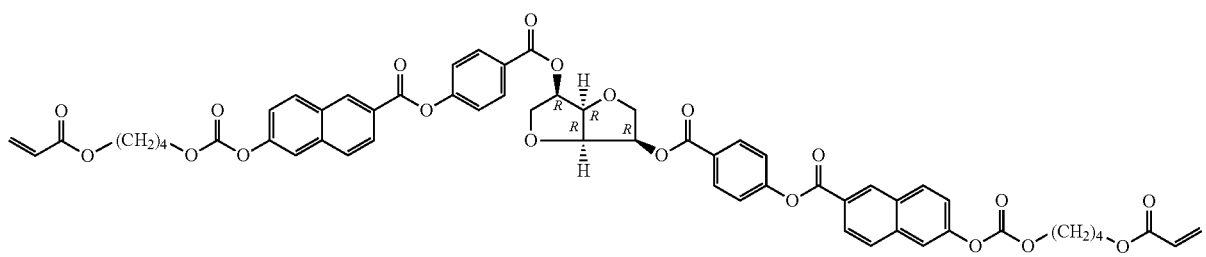

(X3)

The layer of the cholesteric resin was peeled off from the multilayered film thus obtained and pulverized to obtain flakes. 10 parts of the flakes was mixed with 85 parts of a screen ink ("No. 2500 Medium" manufactured by Jujo Chemical Co.) and 5 parts of a dedicated diluent (Tetron standard solvent) of the screen ink to obtain an ink.

Production Example 4: Production of Phase Difference Film

A substrate film containing a norbornene-based polymer as a cyclic structure-containing polymer ("ZEONOR film" manufactured by ZEON Corporation; a film produced by extrusion molding. unstretched product) was prepared. This substrate film was stretched in one direction by 3.9 times at a stretching temperature of 130° C. to obtain a phase difference film. The phase difference film had a thickness of 38 μm and an in-plane retardation of 280 nm.

Example 1

(Brief Description of Display Set)

Figure 20:
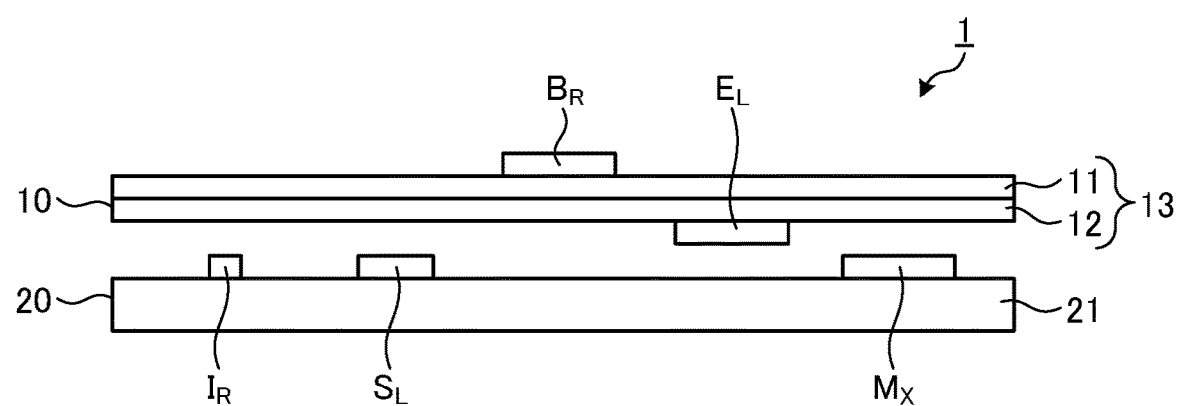
FIG. 20 is a cross-sectional view schematically illustrating a display set produced in Example 1.

FIG. 20 is a cross-sectional view schematically illustrating a display set 1 produced in Example 1. As illustrated in FIG. 20, the display set 1 produced in Example 1 includes a display medium 10 and a display article 20. The display medium 10 includes: a multilayered substrate 13 including a polarized light separation layer 11 and a phase difference layer 12; a character layer $B_R$ provided on a surface of the multilayered substrate 13 on a side with the polarized light separation layer and which serves as a first reflective layer; and a character layer $E_L$ provided on a surface of the multilayered substrate 13 on a side with the phase difference layer and which serves as a second reflective layer. Although the display medium 10 produced in Example 1 includes a supporting layer and a tackiness agent, illustration thereof is omitted in FIG. 20. The display article 20 includes: a foundation article 21; and a character layer $I_R$ which serves as a first display layer, a character layer $S_L$ which serves as a second display layer, and a character layer $M_X$ which serves as a non-chiral layer, the character layers being provided on the foundation article 21. Hereinbelow, a method for producing the display set 1 will be described.

(Production of Display Medium)

The layer of the cholesteric resin of the multilayered film produced in Production Example 1 and an optically isotropic supporting film (film made of polyvinyl chloride) were attached to each other via a tackiness agent, and the substrate film of the multilayered film was removed. A surface of the layer of the cholesteric resin exposed as a result of removing the substrate film was attached to the phase difference film produced in Production Example 4 via a tackiness agent. As a result, as illustrated in FIG. 20, the multilayered substrate 13 was obtained which included a supporting layer (not illustrated) as the supporting film, the tackiness agent (not illustrated), the polarized light separation layer 11 as the layer of the cholesteric resin, the tackiness agent (not illustrated), and the phase difference layer 12 as the phase difference film, in this order.

A character "B" was printed on a surface of the multilayered substrate 13 on a side with the polarized light separation layer using the ink produced in Production Example 2 and was dried to form the character layer $B_R$ which serves as the first reflective layer. Also, a character "E" was printed on a surface of the multilayered substrate 13 on a side with the phase difference layer using the ink produced in Production Example 3 and was dried to form the character layer $E_L$ which serves as the second reflective layer. As a result, the display medium 10 was obtained which included the character layer $B_R$, the polarized light separation layer 11, the phase difference layer 12, and the character layer $E_L$ in this order in the thickness direction.

(Production of Display Article)

On a surface of a resin-made black sheet, a character "I" was printed using the ink produced in Production Example 2 and was dried to form the character layer $I_R$ which serves as the first display layer. Also, on the surface of the black sheet, a character "S" was printed using the ink produced in Production Example 3 and was dried to form the character layer $S_L$ which serves as the second display layer. Further, on the surface of the black sheet, a character "M" was printed using a commercially available silver ink and was dried to form the character layer $M_X$ which serves as the non-chiral layer. As a result, the display article 20 was obtained which included the character layer $I_R$, the character layer $S_L$, and the character layer $M_X$ on the surface of the foundation article 21 as the black sheet.

(Observation)

As illustrated in FIG. 20, the display article 20 was placed on a table (not illustrated) such that the character layer $I_R$, the character layer $S_L$, and the character layer $M_X$ faced upward. The display medium 10 was put on the display article 20 with the side with the character layer $B_R$ facing upward. Under irradiation with unpolarized light, the display set 1 including the display medium 10 and the display article 20 was observed from above. As a result of the observation, while the character layer $I_R$, the character layer $B_R$, and the character layer $M_X$ were able to be visually recognized, the character layer $S_L$ and the character layer $E_L$ were not able to be visually recognized.

After that, the display medium 10 was turned over and was put on the display article 20 again, and the display set 1 was observed again. As a result of the observation, while the character layer $S_L$, the character layer $E_L$, and the character layer $M_X$ were able to be visually recognized, the character layer $I_R$ and the character layer $B_R$ were not able to be visually recognized.

The results of Example 1 are summarized in Table 1 provided below. In the row "Direction of circularly polarized light that can be reflected" in Table 1, the definitions of the abbreviations "Same", "Opposite", and "No function" are as follows.

"Same": The rotation direction of circularly polarized light that the character layer can reflect and the rotation direction of circularly polarized light that the polarized light separation layer can reflect are the same as each other.

"Opposite": The rotation direction of circularly polarized light that the character layer can reflect is opposite to the rotation direction of circularly polarized light that the polarized light separation layer can reflect.

"No function": The character layer does not have a circularly polarized light separation function.

TABLE 1

[Results of Example 1]

| character layer in display media | | | $B_R$ | $E_L$ | |
|---|---|---|---|---|---|
| direction of circularly polarized light that can be reflected | | | same | opposite | |
| character layer in display article | $I_R$ | $S_L$ | | | $M_X$ |
| direction of circularly polarized light that can be reflected | same | opposite | | | no functional |
| visual recognizability in a case where a display media was observed from a side with the character layer $B_R$ (direction of the display media was as shown in FIG. 20) | visible | invisible | visible | invisible | visible |
| visual recognizability in a case where a display media was observed from a side opposite to the character layer | invisible | visible | invisible | visible | visible |

TABLE 1-continued

[Results of Example 1]

B_R (direction of the display media was opposite to the direction shown in FIG. 20)

Example 2

(Description of Display Set)

Figure 21:
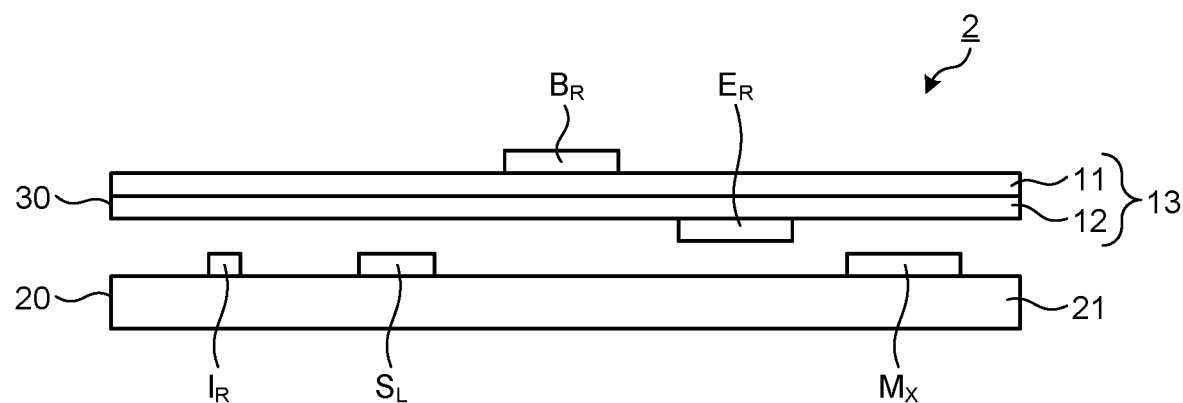
FIG. 21 is a cross-sectional view schematically illustrating a display set produced in Example 2.

FIG. 21 is a cross-sectional view schematically illustrating a display set 2 produced in Example 2. As illustrated in FIG. 21, the display set 2 produced in Example 2 includes a display medium 30 and a display article 20. The display article 20 is the same as that in Example 1. The display medium 30 is the same as the display medium 10 of Example 1 except that a character layer $E_R$ is formed instead of the character layer $E_L$.

The character layer $E_R$ was formed by the same manner as that for the character layer $E_L$ formed in Example 1, except that the ink produced in Production Example 2 was used instead of the ink produced in Production Example 3. This character layer $E_R$ corresponds to the second optional layer having flakes capable of reflecting circularly polarized light having the same rotation direction as the rotational direction of the circularly polarized light that the polarized light separation layer 11 can reflect.

(Observation)

As illustrated in FIG. 21, the display article 20 was put on a table (not illustrated) such that the character layer $I_R$, the character layer $S_L$, and the character layer $M_X$ faced upward. The display medium 30 was put on the display article 20 with the side with the character layer $B_R$ facing upward. Under irradiation with unpolarized light, the display set 2 including the display medium 30 and the display article 20 was observed from above. As a result of the observation, while the character layer $I_R$, the character layer $B_R$, the character layer $E_R$, and the character layer $M_X$ were able to be visually recognized, the character layer $S_L$ was not able to be visually recognized.

After that, the display medium 30 was turned over and was put on the display article 20 again, and the display set 2 was observed again. As a result of the observation, while the character layer $S_L$, the character layer $E_R$, and the character layer $M_X$ were able to be visually recognized, the character layer $I_R$ and the character layer $B_R$ were not able to be visually recognized.

The results of Example 2 are summarized as in Table 2 provided below. In the row "Direction of circularly polarized light that can be reflected" in Table 2, the meanings of the abbreviations "Same", "Opposite", and "No function" are the same as those in Table 1.

TABLE 2

[Results of Example 2]

| | | | | | |
|---|---|---|---|---|---|
| character layer in display media | | | $B_R$ | $E_R$ | |
| direction of circularly polarized light that can be reflected | | | same | same | |
| character layer in display article | $I_R$ | $S_L$ | | | $M_X$ |
| direction of circularly polarized light that can be reflected | same | opposite | | | no functional |
| visual recognizability in a case where a display media was observed from a side with the character layer $B_R$ (direction of the display media was as shown in FIG. 21) | visible | invisible | visible | visible | visible |
| visual recognizability in a case where a display media was observed from a side opposite to the character layer $B_R$ (direction of the display media was opposite to the direction shown in FIG. 21) | invisible | visible | invisible | visible | visible |

Comparative Example 1

(Description of Display Set)

Figure 22:
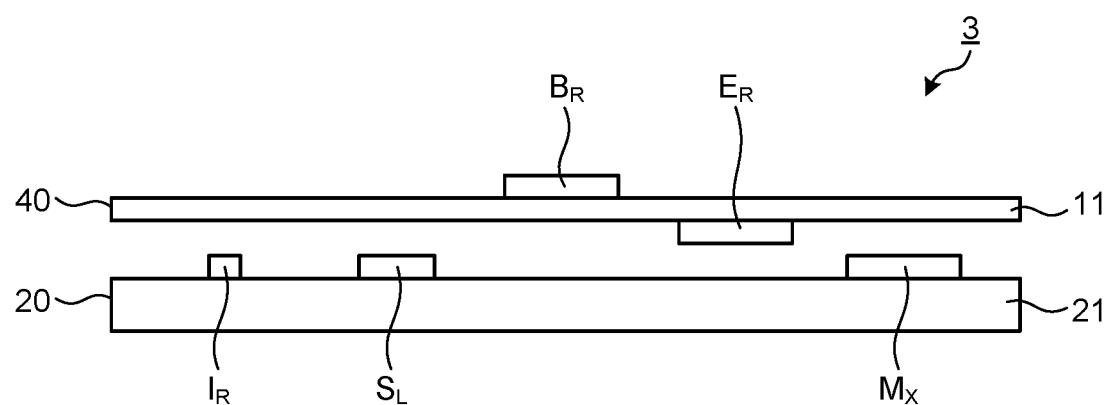
FIG. 22 is a cross-sectional view schematically illustrating a display set produced in Comparative Example 1.

FIG. 22 is a cross-sectional view schematically illustrating a display set 3 produced in Comparative Example 1. As illustrated in FIG. 22, the display set 3 produced in Comparative Example 1 includes a display medium 40 and a display article 20. The display article 20 is the same as that in Example 1. Also, the display medium 40 is the same as the display medium 10 in Example 1 except that the phase difference layer 12 is not provided, and that the character layer $E_R$ is formed instead of the character layer $E_L$.

Specifically, the display medium 40 was produced in the following procedure. The layer of the cholesteric resin of the multilayered film produced in Production Example 1 and an optically isotropic supporting film (film made of polyvinyl chloride) were attached to each other via a tackiness agent, and the substrate film of the multilayered film was removed. A character "B" was printed on the layer of the cholesteric resin using the ink produced in Production Example 2 and was dried to form the character layer $B_R$. Also, a character "E" was printed on the supporting film using the ink produced in Production Example 2 and was dried to form the character layer $E_R$. As a result, the display medium 40 was obtained which included the character layer $B_R$, the polarized light separation layer 11 as the layer of the cholesteric resin, and the character layer $E_R$ in this order in the thickness direction.

(Observation)

As illustrated in FIG. 22, the display article 20 was put on a table (not illustrated) such that the character layer $I_R$, the character layer $S_L$, and the character layer $M_X$ faced upward. The display medium 40 was put on the display article 20 with the side with the character layer $B_R$ facing upward. Under irradiation with unpolarized light, the display set 3 including the display medium 40 and the display article 20 was observed from above. As a result of the observation, while the character layer $S_L$, the character layer $B_R$, and the character layer $M_X$ were able to be visually recognized, the character layer $I_R$ and the character layer $E_R$ were not able to be visually recognized.

After that, the display medium 40 was turned over and was put on the display article 20 again, and the display set 3 was observed again. As a result of the observation, while the character layer $S_L$, the character layer $E_R$, and the character layer $M_X$ were able to be visually recognized, the character layer $I_R$ and the character layer $B_R$ were not able to be visually recognized.

The results of Comparative Example 1 are summarized as in Table 3 provided below. In the row "Direction of circularly polarized light that can be reflected" in Table 3, the meanings of the abbreviations "Same", "Opposite", and "No function" are the same as those in Table 1.

(Observation)

Figure 23:
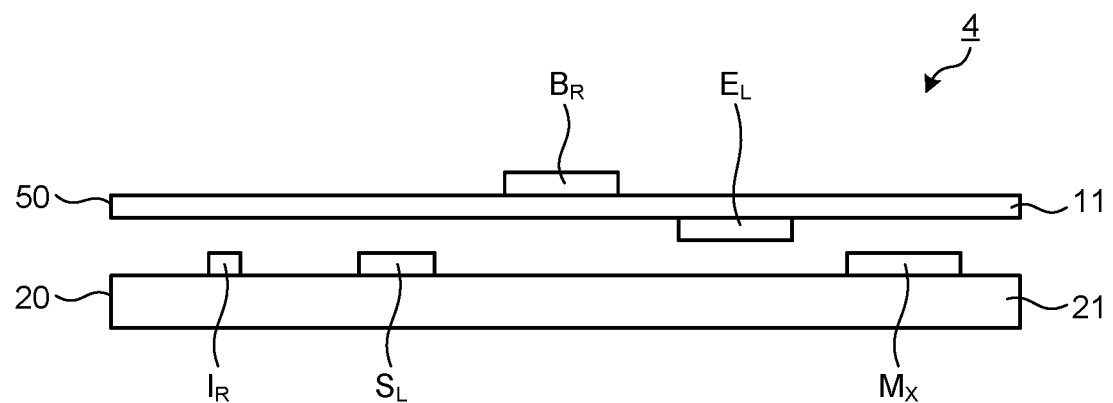
FIG. 23 is a cross-sectional view schematically illustrating a display set produced in Comparative Example 2.

As illustrated in FIG. 23, the display article 20 was put on a table (not illustrated) such that the character layer $I_R$, the character layer $S_L$, and the character layer $M_X$ faced upward. The display medium 50 was put on the display article 20 with the side with the character layer $B_R$ facing upward. Under irradiation with unpolarized light, the display set 4 including the display medium 50 and the display article 20 was observed from above. As a result of the observation, while the character layer $S_L$, the character layer $B_R$, the character layer $E_L$, and the character layer $M_X$ were able to be visually recognized, the character layer $I_R$ was not able to be visually recognized.

TABLE 3

[Results of Comparative Example 1]

| character layer in display media | | | $B_R$ | $E_R$ | |
|---|---|---|---|---|---|
| direction of circularly polarized light that can be reflected | | | same | same | |
| character layer in display article | $I_R$ | $S_L$ | | | $M_X$ |
| direction of circularly polarized light that can be reflected | same | opposite | | | no functional |
| visual recognizability in a case where a display media was observed from a side with the character layer $B_R$ (direction of the display media was as shown in FIG. 22) | invisible | visible | visible | invisible | visible |
| visual recognizability in a case where a display media was observed from a side opposite to the character layer $B_R$ (direction of the display media was opposite to the direction shown in FIG. 22) | invisible | visible | invisible | visible | visible |

Comparative Example 2

(Description of Display Set)

FIG. 23 is a cross-sectional view schematically illustrating a display set 4 produced in Comparative Example 2. As illustrated in FIG. 23, the display set 4 produced in Comparative Example 2 includes a display medium 50 and a display article 20. The display article 20 is the same as that in Example 1. The display medium 50 is the same as the display medium 40 of Comparative Example 1, except that the character layer $E_L$ was formed instead of the character layer $E_R$.

The character layer $E_L$ was formed by the same manner as that for the character layer $E_R$ formed in Comparative Example 1, except that the ink produced in Production Example 3 was used instead of the ink produced in Production Example 2.

After that, the display medium 50 was turned over and was put on the display article 20 again, and the display set 4 was observed again. As a result of the observation, while the character layer $S_L$, the character layer $E_L$, and the character layer $M_X$ were able to be visually recognized, the character layer $I_R$ and the character layer $B_R$ were not able to be visually recognized.

The results of Comparative Example 2 are summarized as in Table 4 provided below. In the row "Direction of circularly polarized light that can be reflected" in Table 4, the meanings of the abbreviations "Same", "Opposite", and "No function" are the same as those in Table 1.

TABLE 4

[Results of Comparative Example 2]

| character layer in display media | | | $B_R$ | $E_L$ | |
|---|---|---|---|---|---|
| direction of circularly polarized light that can be reflected | | | same | opposite | |
| character layer in display article | $I_R$ | $S_L$ | | | $M_X$ |
| direction of circularly polarized light that can be reflected | same | opposite | | | no functional |
| visual recognizability in a case where a display media was observed from a side with the character layer $B_R$ (direction of the display media was as shown in FIG. 23) | invisible | visible | visible | visible | visible |
| visual recognizability in a case where a display media was observed from a side opposite to the character layer $B_R$ (direction of the display media was opposite to the direction shown in FIG. 23) | invisible | visible | invisible | visible | visible |

Comparative Example 3

(Description of Display Set)

Figure 24:
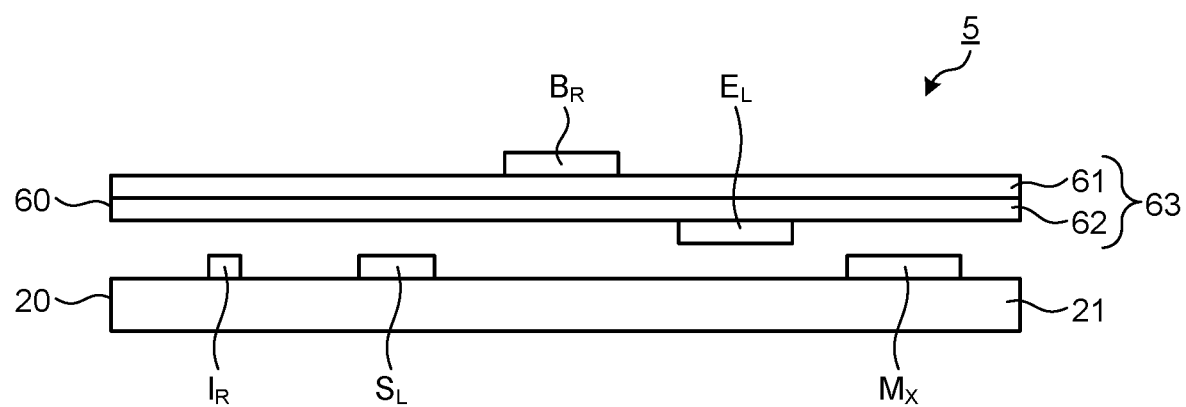
FIG. 24 is a cross-sectional view schematically illustrating a display set produced in Comparative Example 3.

FIG. 24 is a cross-sectional view schematically illustrating a display set 5 produced in Comparative Example 3. As illustrated in FIG. 24, the display set 5 produced in Comparative Example 3 includes a display medium 60 and a display article 20. The display article 20 is the same as that in Example 1. The display medium 60 is the same as the display medium 10 of Example 1, except that a circular polarizing filter 63 including a combination of a linear polarizer 61 and a quarter-wave plate 62 was included instead of the multilayered substrate 13.

Specifically, the display medium 60 was produced in the following procedure. A slightly blackish circular polarizing filter 63 described in Example 1 in Japanese Patent No. 5828182 was prepared. The circular polarizing filter 63 can transmit clockwise circularly polarized light and can absorb counterclockwise circularly polarized light. On the linear polarizer 61 of the circular polarizing filter 63, a character "B" was printed using the ink produced in Production Example 2 and was dried to form the character layer $B_R$. Also, on the quarter-wave plate 62, a character "E" was printed using the ink produced in Production Example 3 and was dried to form the character layer $E_L$. As a result, the display medium 60 was obtained which included the character layer $B_R$, the circular polarizing filter 63, and the character layer $E_L$ in this order in the thickness direction.

(Observation)

As illustrated in FIG. 24, the display article 20 was put on a table (not illustrated) such that the character layer $I_R$, the character layer $S_L$, and the character layer $M_X$ faced upward. The display medium 60 was put on the display article 20 with the side with the character layer $B_R$ facing upward. Under irradiation with unpolarized light, the display set 5 including the display medium 60 and the display article 20 was observed from above. As a result of the observation, while the character layer $I_R$, the character layer $B_R$, and the character layer $M_X$ were able to be visually recognized, the character layer $S_L$ and the character layer $E_L$ were not able to be visually recognized.

After that, the display medium 60 was turned over and was put on the display article 20 again, and the display set 5 was observed again. As a result of the observation, the character layer $I_R$, the character layer $S_L$, the character layer $B_R$, the character layer $E_L$, and the character layer $M_X$ were all able to be visually recognized.

The results of Comparative Example 3 are summarized as in Table 5 provided below. In the row "Direction of circularly polarized light that can be reflected" in Table 5, the meanings of the abbreviations "Same", "Opposite", and "No function" are the same as those in Table 1.

Comparative Example 4

(Description of Display Set)

Figure 25:
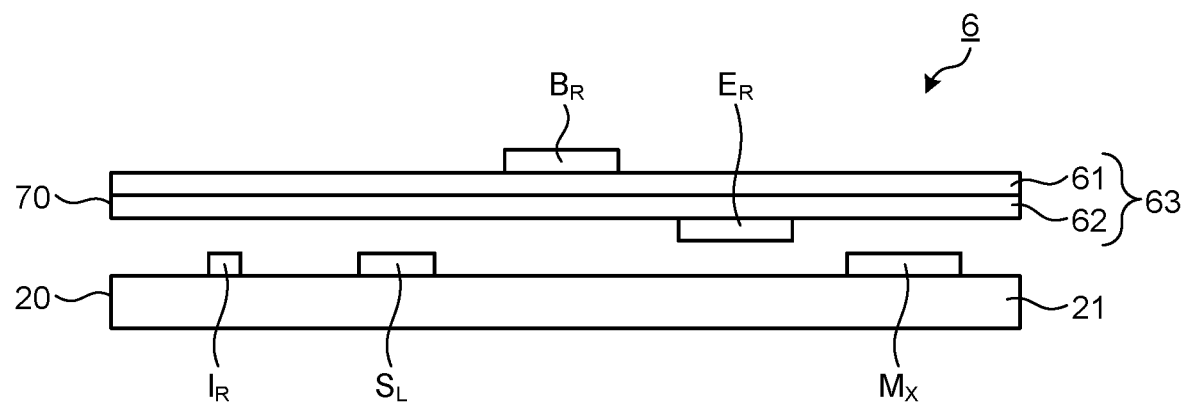
FIG. 25 is a cross-sectional view schematically illustrating a display set produced in Comparative Example 4.

FIG. 25 is a cross-sectional view schematically illustrating a display set 6 produced in Comparative Example 4. As illustrated in FIG. 25, the display set 6 produced in Comparative Example 4 includes a display medium 70 and a display article 20. The display article 20 is the same as that in Example 1. Furthermore, the display medium 70 is the same as the display medium 60 of Comparative Example 3, except that the character layer $E_R$ was formed instead of the character layer $E_L$.

The character layer $E_R$ was formed by the same manner as that for the character layer $E_L$ formed in Comparative Example 3, except that the ink produced in Production Example 2 was used instead of the ink produced in Production Example 3.

(Observation)

As illustrated in FIG. 25, the display article 20 was put on a table (not illustrated) such that the character layer $I_R$, the character layer $S_L$, and the character layer $M_X$ faced upward. The display medium 70 was put on the display article 20 with the side with the character layer $B_R$ facing upward. Under irradiation with unpolarized light, the display set 6 including the display medium 70 and the display article 20 was observed from above. As a result of the observation, while the character layer $I_R$, the character layer $B_R$, the character layer $E_R$, and the character layer $M_X$ were able to be visually recognized, the character layer $S_L$ was not able to be visually recognized.

After that, the display medium 70 was turned over and was put on the display article 20 again, and the display set 6 was observed again. As a result of the observation, the character layer $I_R$, the character layer $S_L$, the character layer $B_R$, the character layer $E_R$, and the character layer $M_X$ were all able to be visually recognized.

The results of Comparative Example 4 are summarized as in Table 6 provided below. In the row "Direction of circularly polarized light that can be reflected" in Table 6, the meanings of the abbreviations "Same", "Opposite", and "No function" are the same as those in Table 1.

TABLE 5

[Results of Comparative Example 3]

|  |  |  |  |  |  |
|---|---|---|---|---|---|
| character layer in display media |  |  | $B_R$ | $E_L$ |  |
| direction of circularly polarized light that can be reflected |  |  | same | opposite |  |
| character layer in display article | $I_R$ | $S_L$ |  |  | $M_X$ |
| direction of circularly polarized light that can be reflected | same | opposite |  |  | no functional |
| visual recognizability in a case where a display media was observed from a side with the character layer $B_R$ (direction of the display media was as shown in FIG. 24) | visible | invisible | visible | invisible | visible |
| visual recognizability in a case where a display media was observed from a side opposite to the character layer $B_R$ (direction of the display media was opposite to the direction shown in FIG. 24) | visible | visible | visible | visible | visible |

TABLE 6

[Results of Comparative Example 4]

|  | | | $B_R$ | $E_R$ | |
|---|---|---|---|---|---|
| character layer in display media | | | same | same | |
| direction of circularly polarized light that can be reflected | | | | | |
| character layer in display article | $I_R$ | $S_L$ | | | $M_X$ |
| direction of circularly polarized light that can be reflected | same | opposite | | | no functional |
| visual recognizability in a case where a display media was observed from a side with the character layer $B_R$ (direction of the display media was as shown in FIG. 25) | visible | invisible | visible | visible | visible |
| visual recognizability in a case where a display media was observed from a side opposite to the character layer $B_R$ (direction of the display media was opposite to the direction shown in FIG. 25) | visible | visible | visible | visible | visible |

REFERENCE SIGN LIST 100 display media
110 multilayered substrate
110U surface of a multilayered substrate on a side with a polarized light separation layer
110D surface of a multilayered substrate on a side with a phase difference layer
111 polarized light separation layer
112 phase difference layer
120 first reflective layer
200 display medium
220 second reflective layer
300 display medium
400 display set
500 display article
510 foundation article
520 first display layer
530 second display layer
540 non-chiral layer

The invention claimed is:

1. A display medium comprising: a multilayered substrate including a polarized light separation layer and a phase difference layer; and a first reflective layer provided on a surface of the multilayered substrate on a side with the polarized light separation layer, wherein:
   the polarized light separation layer is capable of reflecting circularly polarized light which has one rotation direction $D_A$, and is capable of transmitting circularly polarized light which has an opposite rotation direction to the rotation direction $D_A$;
   the first reflective layer is capable of reflecting circularly polarized light which has one rotation direction $D_{B1}$, and is capable of transmitting circularly polarized light which has an opposite rotation direction to the rotation direction $D_{B1}$;
   the rotation direction $D_A$ of the circularly polarized light that the polarized light separation layer is capable of reflecting and the rotation direction $D_{B1}$ of the circularly polarized light that the first reflective layer is capable of reflecting are the same as each other, and
   an in-plane retardation of the phase difference layer at a measurement wavelength of 590 nm is "$\{(2n+1)/2\} \times 590$ nm$-30$ nm" or more and "$\{(2n+1)/2\} \times 590$ nm$+30$ nm" or less, wherein
   n represents an integer of 0 or larger.

2. The display medium according to claim 1, comprising a second reflective layer provided on a surface of the multilayered substrate on a side with the phase difference layer, wherein:
   the second reflective layer is capable of reflecting circularly polarized light which has one rotation direction $D_{B2}$, and is capable of transmitting circularly polarized light which has an opposite rotation direction to the rotation direction $D_{B2}$; and
   the rotation direction $D_A$ of the circularly polarized light that the polarized light separation layer is capable of reflecting is opposite to the rotation direction $D_{B2}$ of the circularly polarized light that the second reflective layer is capable of reflecting.

3. The display medium according to claim 1, wherein the first reflective layer includes a flake of a resin which has cholesteric regularity.

4. The display medium according to claim 1, wherein a wavelength width of a wavelength range in which the polarized light separation layer is capable of reflecting circularly polarized light is 70 nm or wider.

5. The display medium according to claim 1, wherein the polarized light separation layer is a layer of a resin which has cholesteric regularity.

6. A display article to be observed through the display medium according to claim 1,
   the display article comprising: a foundation article and a display layer provided on the foundation article, wherein
   the display layer is capable of reflecting circularly polarized light which has one rotation direction $D_D$, and is capable of transmitting circularly polarized light which has an opposite rotation direction to the rotation direction $D_D$.

7. The display article according to claim 6, comprising, as the display layer, at least one of
   a first display layer that is capable of reflecting circularly polarized light which has a rotation direction $D_{D1}$ which is the same as the rotation direction $D_A$ of the circularly polarized light that the polarized light separation layer is capable of reflecting, and is capable of transmitting circularly polarized light which has an opposite rotation direction to the rotation direction $D_{D1}$, and
   a second display layer that is capable of reflecting circularly polarized light which has a rotation direction $D_{D2}$ which is opposite to the rotation direction $D_A$ of the circularly polarized light that the polarized light separation layer is capable of reflecting, and is capable of transmitting circularly polarized light which has an opposite rotation direction to the rotation direction $D_{D2}$.

8. A display set comprising:
the display medium according to claim 1; and
a display article, wherein
the display article comprises: a foundation article and a display layer provided on the foundation article, and
the display layer is capable of reflecting circularly polarized light which has one rotation direction $D_D$, and is capable of transmitting circularly polarized light which has an opposite rotation direction to the rotation direction $D_D$.

9. A display medium comprising: a multilayered substrate including a polarized light separation layer and a phase difference layer; and a second reflective layer provided on a surface of the multilayered substrate on a side with the phase difference layer, wherein:
the polarized light separation layer is capable of reflecting circularly polarized light which has one rotation direction $D_A$, and is capable of transmitting circularly polarized light which has an opposite rotation direction to the rotation direction $D_A$;
the second reflective layer is capable of reflecting circularly polarized light which has one rotation direction $D_{B2}$, and is capable of transmitting circularly polarized light which has an opposite rotation direction to the rotation direction $D_{B2}$;
the rotation direction $D_A$ of the circularly polarized light that the polarized light separation layer is capable of reflecting is opposite to the rotation direction $D_{B2}$ of the circularly polarized light that the second reflective layer is capable of reflecting, and
an in-plane retardation of the phase difference layer at a measurement wavelength of 590 nm is "$\{2n+1\}/2\} \times$ 590 nm-30 nm" or more and "$\{2n+1\}/2\} \times 590$ nm+30 nm" or less, wherein
n represents an integer of 0 or larger.

10. The display medium according to claim 9, wherein the second reflective layer includes a flake of a resin which has cholesteric regularity.

11. The display medium according to claim 9, wherein a wavelength width of a wavelength range in which the polarized light separation layer is capable of reflecting circularly polarized light is 70 nm or wider.

12. The display medium according to claim 9, wherein the polarized light separation layer is a layer of a resin which has cholesteric regularity.

13. A display article to be observed through the display medium according to claim 9,
the display article comprising: a foundation article and a display layer provided on the foundation article, wherein
the display layer is capable of reflecting circularly polarized light which has one rotation direction $D_D$, and is capable of transmitting circularly polarized light which has an opposite rotation direction to the rotation direction $D_D$.

14. The display article according to claim 13, comprising, as the display layer, at least one of
a first display layer that is capable of reflecting circularly polarized light which has a rotation direction $D_{D1}$ which is the same as the rotation direction $D_A$ of the circularly polarized light that the polarized light separation layer is capable of reflecting, and is capable of transmitting circularly polarized light which has an opposite rotation direction to the rotation direction $D_{D1}$, and
a second display layer that is capable of reflecting circularly polarized light which has a rotation direction $D_{D2}$ which is opposite to the rotation direction $D_A$ of the circularly polarized light that the polarized light separation layer is capable of reflecting, and is capable of transmitting circularly polarized light which has an opposite rotation direction to the rotation direction $D_{D2}$.

15. A display set comprising:
the display medium according to claim 9; and
a display article, wherein
the display article comprises: a foundation article and a display layer provided on the foundation article, and
the display layer is capable of reflecting circularly polarized light which has one rotation direction $D_D$, and is capable of transmitting circularly polarized light which has an opposite rotation direction to the rotation direction $D_D$.

* * * * *